US012726856B2

(12) United States Patent
Veluchamy et al.

(10) Patent No.: US 12,726,856 B2
(45) Date of Patent: Sep. 1, 2026

(54) SLEEP MODE IMPLEMENTATION BY CONTROL-PLANE SECTION TYPE 4 MESSAGING IN A TELECOMMUNICATION NETWORK

(71) Applicants: RAKUTEN SYMPHONY, INC., Tokyo (JP); RAKUTEN MOBILE, INC., Tokyo (JP)

(72) Inventors: Lingasamy Veluchamy, Karnataka (IN); Awn Muhammad, Tokyo (JP)

(73) Assignees: RAKUTEN SYMPHONY, INC., Tokyo (JP); RAKUTEN MOBILE, INC., Tokyo (JP)

( * ) Notice: Subject to any disclaimer, the term of this patent is extended or adjusted under 35 U.S.C. 154(b) by 227 days.

(21) Appl. No.: 18/696,440

(22) PCT Filed: Dec. 28, 2023

(86) PCT No.: PCT/US2023/086172
§ 371 (c)(1),
(2) Date: Mar. 28, 2024

(87) PCT Pub. No.: WO2024/145437
PCT Pub. Date: Jul. 4, 2024

(65) Prior Publication Data

US 2026/0156568 A1 Jun. 4, 2026

(30) Foreign Application Priority Data

Dec. 28, 2022 (IN) ............................ 202221076397
Feb. 3, 2023 (IN) ............................ 202321007046
(Continued)

(51) Int. Cl.
*H04W 52/02* (2009.01)
*H04B 7/06* (2006.01)
*H04L 41/0816* (2022.01)

(52) U.S. Cl.
CPC ...... *H04W 52/0206* (2013.01); *H04B 7/0691* (2013.01); *H04L 41/0816* (2013.01)

(58) Field of Classification Search
CPC ............ H04W 52/0206; H04B 7/0691; H04L 41/0816
See application file for complete search history.

(56) References Cited

U.S. PATENT DOCUMENTS 10,916,315 B2 2/2021 Yu et al.
11,570,761 B2 1/2023 Ryu et al.
(Continued)

FOREIGN PATENT DOCUMENTS

WO 2024/024423 A1 2/2024
WO 2024/102280 A1 5/2024
WO 2024/145340 A1 7/2024

OTHER PUBLICATIONS

Johan Von Perner et al., 'Network energy efficiency', NGMN Alliance, Dec. 7, 2021, V1.1 (56 pages).
(Continued)

*Primary Examiner* — Natasha W Cosme
(74) *Attorney, Agent, or Firm* — Sughrue Mion, PLLC

(57) ABSTRACT

An apparatus includes an O-DU configured to receive from a radio unit (O-RU), configuration capability information via management plane (M-Plane) command from the O-RU. The O-DU receives, from a higher layer network function, a request to reconfigure an antenna array. The O-DU determines a sleep mode type supported by the O-RU based on the configuration capability information from the O-RU. The O-DU, based on the request to reconfigure the antenna array from the higher layer network function, and based on the supported sleep mode type, applies the supported sleep mode type via a C-Plane Section Type 4 message or a M-Plane command to the O-RU.

20 Claims, 19 Drawing Sheets

(30) Foreign Application Priority Data

| | | | |
|---|---|---|---|
| Mar. 10, 2023 | (IN) | ............................. | 202321016149 |
| Mar. 31, 2023 | (IN) | ............................. | 202341024486 |
| May 4, 2023 | (IN) | ............................. | 202341031813 |

(56) References Cited

U.S. PATENT DOCUMENTS

| | | | | |
|---|---|---|---|---|
| 11,601,819 | B2 | 3/2023 | Chou et al. | |
| 11,627,562 | B2 | 4/2023 | Ryu et al. | |
| 11,917,527 | B2 | 2/2024 | Chou | |
| 11,985,515 | B2 | 5/2024 | Raghavan et al. | |
| 12,200,498 | B2 | 1/2025 | Chou et al. | |
| 12,382,416 | B2 | 8/2025 | Song et al. | |
| 12,501,417 | B2 | 12/2025 | Guchhait et al. | |
| 2020/0258583 | A1 | 8/2020 | Yu et al. | |
| 2020/0329381 | A1 | 10/2020 | Chou et al. | |
| 2020/0358583 | A1 | 11/2020 | Ryu et al. | |
| 2021/0120538 | A1 | 4/2021 | Huh et al. | |
| 2021/0136598 | A1 | 5/2021 | Raghavan et al. | |
| 2021/0136788 | A1* | 5/2021 | Lim ...................... | H04W 72/12 |
| 2021/0195517 | A1 | 6/2021 | Yang et al. | |
| 2021/0258866 | A1 | 8/2021 | Chou | |
| 2021/0385686 | A1* | 12/2021 | Ahmed ................. | H04W 28/06 |
| 2022/0077587 | A1 | 3/2022 | Wu et al. | |
| 2022/0159525 | A1 | 5/2022 | Chou et al. | |
| 2022/0225264 | A1 | 7/2022 | Song et al. | |
| 2022/0232508 | A1 | 7/2022 | Song et al. | |
| 2022/0394680 | A1 | 12/2022 | Kim et al. | |
| 2023/0045847 | A1 | 2/2023 | Wong et al. | |
| 2023/0133083 | A1 | 5/2023 | Song et al. | |
| 2023/0144337 | A1 | 5/2023 | Kumar et al. | |
| 2023/0189006 | A1 | 6/2023 | Chou et al. | |
| 2023/0284048 | A1 | 9/2023 | O'Shea et al. | |
| 2023/0402766 | A1 | 12/2023 | Garyantes et al. | |
| 2024/0063851 | A1 | 2/2024 | Sachidanand Sinha et al. | |
| 2024/0073815 | A1 | 2/2024 | Farhoodi et al. | |
| 2024/0107443 | A1 | 3/2024 | Singh et al. | |
| 2024/0129876 | A1 | 4/2024 | Sarma et al. | |
| 2024/0155393 | A1 | 5/2024 | Han et al. | |
| 2024/0205690 | A1 | 6/2024 | Kurian et al. | |
| 2024/0214927 | A1 | 6/2024 | Garyantes et al. | |
| 2024/0224305 | A1 | 7/2024 | Kang et al. | |
| 2024/0250904 | A1 | 7/2024 | Shete et al. | |
| 2024/0259061 | A1 | 8/2024 | Abotabl et al. | |
| 2024/0276188 | A1 | 8/2024 | Shete et al. | |
| 2024/0283507 | A1 | 8/2024 | Ly et al. | |
| 2024/0357479 | A1 | 10/2024 | Bhaskaran | |
| 2025/0008378 | A1 | 1/2025 | Veluchamy et al. | |
| 2025/0048251 | A1 | 2/2025 | Shete et al. | |
| 2025/0184278 | A1 | 6/2025 | Nesteroff et al. | |
| 2025/0203505 | A1 | 6/2025 | Muhammad et al. | |
| 2025/0247291 | A1 | 7/2025 | Shete et al. | |

OTHER PUBLICATIONS

O-RAN Alliance, "O-RAN Working Group 4 (Open Fronthaul Interfaces WG) Management Plane Specification", 2022, O-RAN. WG4.MP.0-v10.00, Technical Specification, (260 pages).

O-RAN Alliance, "O-RAN Work Group 1 (Use Cases and Overall Architecture) Network Energy Saving Use Cases Technical Report", 2023, O-RAN.WG1.NESUC-R003-v01.00, Technical Report, (65 pages).

O-RAN Alliance, "O-RAN Working Group 1 Use Cases Analysis Report", 2022, O-RAN.WG1.Use-Cases-Analysis-Report-v09.00, Technical Report, (65 pages).

O-RAN Alliance, "O-RAN Working Group 4 (Open Fronthaul Interfaces WG) Control, User and Synchronization Plane Specification", 2022, O-RAN.WG4.CUS.0-R003-v11.00, Technical Specification, (6 pages).

Lee, et al., "Design of a Management Plane for 5G Open Fronthaul Interface", IEEE, ICTC 2020, pp. 946-948 (3 pages).

* cited by examiner st4CmdType 'TRX-CONTROL'

| 0 (msb) | 1 | 2 | 3 | 4 | 5 | 6 | 7 (lsb) | # of bytes | |
|---|---|---|---|---|---|---|---|---|---|
| transport header, see section 5.1.3 | | | | | | | | 8 | Octet 1 |
| common Section Type 4 header | | | | | | | | 8 | Octet 9 |
| Section Type 4 common part of the command header | | | | | | | | 8 | Octet 17 |
| bothDir | turnOff | sleepDurIndex[3:0] | | | | sleepDepth[1:0] | | 1 | Octet 25 |
| reserved | | | | log2maskbits[3:0] | | | | 1 | Octet 26 |
| antLayerMask[15:0]* - reserved when cmdScope ≠ ARRAY-COMMAND | | | | | | | | 2 | Octet 27 |
| antMask[x:0] - only present when cmdScope = ARRAY-COMMAND | | | | | | | | var | Octet 29 |

FIG. 12 st4CmdType 'TRX-CONTROL/ADVANCED-SLEEP-MODE'

| 0 (msb) | 1 | 2 | 3 | 4 | 5 | 6 | 7 (lsb) | # of bytes | |
|---|---|---|---|---|---|---|---|---|---|
| transport header, see section 5.1.3 | | | | | | | | 8 | Octet 1 |
| common Section Type 4 header | | | | | | | | 8 | Octet 9 |
| Section Type 4 common part of the command header | | | | | | | | 8 | Octet 17 |
| bothDir | OnOff | symbolMask[0:1] | asmflag[0:1] | eAxCmask[0:15] | | sleepDepth[1:0] | | 3 | Octet 25 |
| extnumslots[0:15] | | symbolMask[0:11] | | log2maskbits[3:0] | | | | 4 | Octet 28 |
| antLayerMask[15:0]* - reserved when cmdScope ≠ ARRAY-COMMAND | | | | | | | | 2 | Octet 32 |
| antMask[x:0] - only present when cmdScope = ARRAY-COMMAND | | | | | | | | var | Octet 34 |

FIG. 13

| st4CmdType 'TRX-CONTROL/ADVANCED-SLEEP-MODE' | | | | | | | | | |
|---|---|---|---|---|---|---|---|---|---|
| 0 (msb) | 1 | 2 | 3 | 4 | 5 | 6 | 7 (lsb) | # of bytes | |
| transport header, see section 5.1.3 | | | | | | | | 8 | Octet 1 |
| common Section Type 4 header | | | | | | | | 8 | Octet 9 |
| Section Type 4 common part of the command header | | | | | | | | 8 | Octet 17 |
| bothDir, OnOff | symbolMask[0:1] | | asmflag[0:1] | eAxCmask[0:15] | | sleepDepth[1:0] | | 3 | Octet 25 |
| extnumslots[0:15] | | symbolMask[0:11] | | log2maskbits[3:0] | | | | 4 | Octet 28 |
| antLayerMask[15:0]* - reserved when cmdScope ≠ ARRAY-COMMAND | | | | | | | | 2 | Octet 32 |
| antMask[x:0] - only present when cmdScope = ARRAY-COMMAND | | | | | | | | var | Octet 34 |

| Symbol mask | 0 (MSB) | 1 | 2 | 3 | 4 | 5 | 6 | 7 | 8 | 9 | 10 | 11 | 12 | 13 (LSB) |
|---|---|---|---|---|---|---|---|---|---|---|---|---|---|---|
| Last 6 symbols | 0 | 0 | 0 | 0 | 0 | 0 | 0 | 0 | 1 | 1 | 1 | 1 | 1 | 1 |
| First 5 symbols | 1 | 1 | 1 | 1 | 1 | 0 | 0 | 0 | 0 | 0 | 0 | 0 | 0 | 0 |

FIG. 14

| st4CmdType 'TRX-CONTROL' | | | | | | | | | |
|---|---|---|---|---|---|---|---|---|---|
| 0 (msb) | 1 | 2 | 3 | 4 | 5 | 6 | 7 (lsb) | # of bytes | |
| transport header, see section 5.1.3 | | | | | | | | 8 | Octet 1 |
| common Section Type 4 header | | | | | | | | 8 | Octet 9 |
| Section Type 4 common part of the command header | | | | | | | | 8 | Octet 17 |
| bothDir | turnOff | sleepDurIndex[3:0] | | | | sleepDepth[1:0] | | 1 | Octet 25 |
| reserved | | | | log2maskbits[3:0] | | | | 1 | Octet 26 |
| antLayerMask[15:0]* - reserved when cmdScope ≠ ARRAY-COMMAND | | | | | | | | 2 | Octet 27 |
| antMask[x:0] - only present when cmdScope = ARRAY-COMMAND | | | | | | | | var | Octet 29 |

| Section Type 4: Command common header format | | | | | | | | | |
|---|---|---|---|---|---|---|---|---|---|
| 0 (msb) | 1 | 2 | 3 | 4 | 5 | 6 | 7 (lsb) | # of bytes | |
| st4CmdType = 1 | | | | | | | | 1 | Octet 17 |
| st4CmdLen | | | | | | | | 1 | Octet 18 |
| st4CmdLen | | | | | | | | 1 | Octet 19 |
| numSlots | | | | | | | | 1 | Octet 20 |
| ackNackReqId | | | | | | | | 2 | Octet 21 |
| reserved | | | | | | | | 2 | Octet 23 |

FIG. 18

SLEEP MODE IMPLEMENTATION BY CONTROL-PLANE SECTION TYPE 4 MESSAGING IN A TELECOMMUNICATION NETWORK

CROSS-REFERENCE TO RELATED APPLICATION(S)

This application is a National Stage of International Application No. PCT/US2023/086172 filed on Dec. 28, 2023, claiming priorities based on Indian Provisional Patent Application No. 202221076397 filed on Dec. 28, 2022, Indian Provisional Patent Application No. 202341031813 filed on May 4, 2023, Indian Provisional Patent Application No. 202321007046 filed on Feb. 3, 2023, Indian Provisional Patent Application No. 202321016149 filed on Mar. 10, 2023, and Indian Provisional Patent Application No. 202341024486 filed on Mar. 31, 2023, the disclosures of which are incorporated by reference herein in their entireties.

FIELD

Apparatuses and methods consistent with example embodiments of the present disclosure relate to a sleep mode implementation by Control-Plane (C-Plane) Section Type (ST) 4 messaging in a telecommunication network.

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based), or could be in physical hardware form (e.g., non-VM based).

To this end, O-RAN disaggregates the RAN functions into a centralized unit (CU), a distributed unit (DU), and a radio unit (RU). The CU may be a logical node for hosting Radio Resource Control (RRC), Service Data Adaptation Protocol (SDAP), and/or Packet Data Convergence Protocol (PDCP) sublayers of the RAN. The DU may be a logical node hosting Radio Link Control (RLC), Media Access Control (MAC), and Physical (PHY) sublayers of the RAN. The RU may be a physical node that converts radio signals from antennas to digital signals that can be transmitted over the Front Haul to a DU. Because these entities have open protocols and interfaces between them, they can be developed by different vendors.

FIG. 1 illustrates an O-RAN architecture in the related art. RAN functions in the O-RAN architecture may be controlled and optimized by a RAN Intelligent Controller (RIC). The RIC may be a software-defined component that implements modular applications to facilitate the multivendor operability required in the O-RAN system, as well as to automate and optimize RAN operations. As shown in FIG.

1, the RIC may be divided into two types: a non-real-time RIC (Non-RT RIC) 120 and a near-real-time RIC (Near-RT RIC) 130.

The Non-RT RIC 120 may be the control point of a non-real-time control loop and may operate on a timescale greater than 1 second within a Service Management and Orchestration (SMO) framework 110. Its functionalities may be implemented through modular applications called rApps, and may include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which may be the interface that connects the SMO to RAN managed elements (e.g., Near-RT RIC 130, O-RAN Centralized Unit (O-CU) 140, 150, O-RAN Distributed Unit (O-DU) 170, etc.).

The Near-RT RIC 130 may operate on a timescale between 10 milliseconds and 1 second and may be coupled with the O-DU 170, the O-CU (disaggregated into the O-CU control plane (O-CU-CP) 140 and the O-CU user plane (O-CU-UP) 150), and an open evolved NodeB (O-eNB) 160 via the E2 interface. The Near-RT RIC 130 may use the E2 interface to control the underlying RAN elements (E2 nodes/network functions (NFs)) over a near-real-time control loop. The Near-RT RIC 130 may monitor, suspend/stop, override, and control the E2 nodes (O-CU 140, 150, O-DU 170, and O-eNB 160) via policies. For example, the Near-RT RIC 130 may set policy parameters on activated functions of the E2 nodes. Further, the Near-RT RIC 130 may host xApps to implement functions such as quality of service (QoS) optimization, mobility optimization, slicing optimization, interference mitigation, load balancing, security, etc.

Here, the O-CU-CP 140 and the O-CU-UP 150 may be coupled to each other via the E1 interface and may be coupled to the O-DU 170 via the F1-c interface and F1-u interface, respectively. Further, the O-RU 180 may be coupled to the O-DU 170 via the Open Fronthaul (OF) Control (C), User (U), Synchronization(S), and Management (M) Planes, and may be coupled to the SMO 110 via the OF M-Plane.

The two types of RICs work together to optimize the O-RAN. For example, the Non-RT RIC 120 may provide the policies, data, and AI/ML models enforced and used by the Near-RT RIC 130 for RAN optimization, and the Near-RT RIC 130 may return policy feedback (i.e., how the policy set by the Non-RT RIC 120 works).

As mentioned above, the Non-RT RIC 120 may be located within the SMO framework 110, which manages and orchestrates RAN elements. Specifically, the SMO 110 may manage and orchestrate what is referred to as the O-Ran Cloud (O-Cloud) 190. The O-Cloud 190 may be a collection of physical RAN nodes that host the RICs, O-CUs, and O-DUs, the supporting software components (e.g., the operating systems and runtime environments), and the SMO 110 itself. In other words, the SMO 110 may manage the O-Cloud 190 from within. The O2 interface may be the interface between the SMO 110 and the O-Cloud 190 it resides in. Through the O2 interface, the SMO 110 may provide infrastructure management services (IMS) and deployment management services (DMS).

In the related art, due to a lack of communication between the O-DU and O-RU, network energy-saving methods cannot be dynamically implemented.

Moreover, in the related, it is impossible to effectively control the power consumption of O-RUs due to the vendor-centric, proprietary setting of TRx arrays (i.e., antenna arrays) that are not known to the O-DU.

For example, muting (e.g., turning off) a part of antenna elements in an antenna array along with their respective RF transceiver chains is not possible.

SUMMARY

According to embodiments, the present disclosure provides a sleep mode implementation by Control-Plane (C-Plane) Section Type (ST) 4 messaging in a telecommunication network. Receiving, by a distributed unit (O-DU) from a radio unit (O-RU) (i.e., sending, by the O-RU to the O-DU configuration capability information via management plane (M-Plane) messaging that enables the O-DU to determine a sleep mode type supported by the O-RU, wherein the supported sleep mode type is based on the configuration capability information from the O-RU and based on the request to reconfigure the antenna array from the higher layer network function. The informed determination enables the O-DU to apply the supported sleep mode type via a C-Plane Section Type 4 message or M-Plane command to the O-RU and the O-RU to activate the sleep mode type to parts of the O-RU based on the supported sleep mode type from the O-DU.

The detailed application and activation of sleep mode types as set forth above has the advantage of achieving maximum power savings by powering down parts of the O-RU based on a supported sleep mode implementation as provided by the O-DU.

An apparatus includes a distributed unit (O-DU), the O-DU configured to: receive from a radio unit (O-RU), configuration capability information via management plane (M-Plane) messaging from the O-RU. The O-DU receives from a higher layer network function a request to reconfigure an antenna array. The O-DU determines a sleep mode type supported by the O-RU based on the configuration capability information from the O-RU and based on the request to reconfigure the antenna array from the higher layer network function. The O-DU applies the supported sleep mode type via a C-Plane Section Type 4 message or M-Plane command to the O-RU based on the supported sleep mode type.

An apparatus includes a radio unit (O-RU) configured to: send configuration capability information via a management plane (M-Plane) command to an open distributed unit (O-DU); The O-RU receives a sleep mode type supported by the O-RU via a C-Plane Section Type 4 message or M-Plane command from the O-DU, wherein the supported sleep mode type is based on the configuration capability information of the O-RU and a request to reconfigure the antenna array from a higher layer network function. The O-RU activates the sleep mode type to parts of the O-RU based on the supported sleep mode type for the O-RU.

A method, the method includes receiving, by a distributed unit (O-DU) from a radio unit (O-RU), configuration capability information via management plane (M-Plane) messaging from the O-RU. The method includes receiving, by the O-DU from a higher layer network function, a request to reconfigure an antenna array. The method includes determining, by the O-DU, a sleep mode type supported by the O-RU. The supported by the O-RU is based on the configuration capability information from the O-RU and based on the request to reconfigure the antenna array from the higher layer network function. The method includes applying, by the O-DU, the supported sleep mode type via a C-Plane Section Type 4 message or M-Plane command to the O-RU based on the supported sleep mode type.

A method, the method includes sending, by a radio unit (O-RU) to an open distributed unit (O-DU), configuration capability information via a management plane (M-Plane) command. The method includes receiving, by the O-RU from the O-DU, a sleep mode type supported by the O-RU via a C-Plane Section Type 4 message or M-Plane command, wherein the supported sleep mode type is based on the configuration capability information of the O-RU and a request to reconfigure the antenna array from a higher layer network function. The method includes activating, by the O-RU, the sleep mode type to parts of the O-RU based on the supported sleep mode type for the O-RU.

A non-transitory computer-readable recording medium having recorded thereon instructions executable by at least one processor configured to execute instructions to implement a method, the method includes receiving, by a distributed unit (O-DU) from a radio unit (O-RU), configuration capability information via management plane (M-Plane) messaging from the O-RU. The method includes receiving, by the O-DU from a higher layer network function, a request to reconfigure an antenna array; based on the configuration capability information from the O-RU. the method includes determining, by the O-DU, a sleep mode type supported by the O-RU based on the request to reconfigure the antenna array from the higher layer network function. The method includes applying, by the O-DU, the supported sleep mode type via a C-Plane Section Type 4 message or M-Plane command to the O-RU based on the supported sleep mode type.

A non-transitory computer-readable recording medium having recorded thereon instructions executable by at least one processor configured to execute instructions to implement a method, the method includes: sending, by a radio unit (O-RU) to an open distributed unit (O-DU), configuration capability information via a management plane (M-Plane) command. The method includes receiving, by the O-RU from the O-DU, a sleep mode type supported by the O-RU via a C-Plane Section Type 4 message or M-Plane command, wherein the supported sleep mode type is based on the configuration capability information of the O-RU and a request to reconfigure the antenna array from a higher layer network function. The method includes activating, by the O-RU, the sleep mode type to parts of the O-RU based on the supported sleep mode type for the O-RU.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 12 illustrates a sleep mode implementation according to a Section Type 4 command type (ST4CmdType) TRX CONTROL. Referring to FIG. 13, sleep modes have different sleep depths according to an example embodiment;

FIG. 13 illustrates a sleep mode implementation according to a Section Type 4 command type (ST4CmdType) st4CmdType 'TRX-CONTROL/ADVANCED-SLEEP-MODE' according to an example embodiment;

FIG. 14 illustrates a sleep mode implementation according to a Section Type 4 command type (ST4CmdType) st4CmdType 'TRX-CONTROL/ADVANCED-SLEEP-MODE' comprising a parameter symbolMask for implementing a symbol level sleep duration to support sleep mode type 0 (SMO) according to an example embodiment;

FIG. 18 illustrates an embodiment for TRx control and sleep modes according to a Section Type 4 command type (ST4CmdType) TRX-CONTROL and Section Type 4 command common header format. according to another example embodiment.

DETAILED DESCRIPTION

Figure 1:
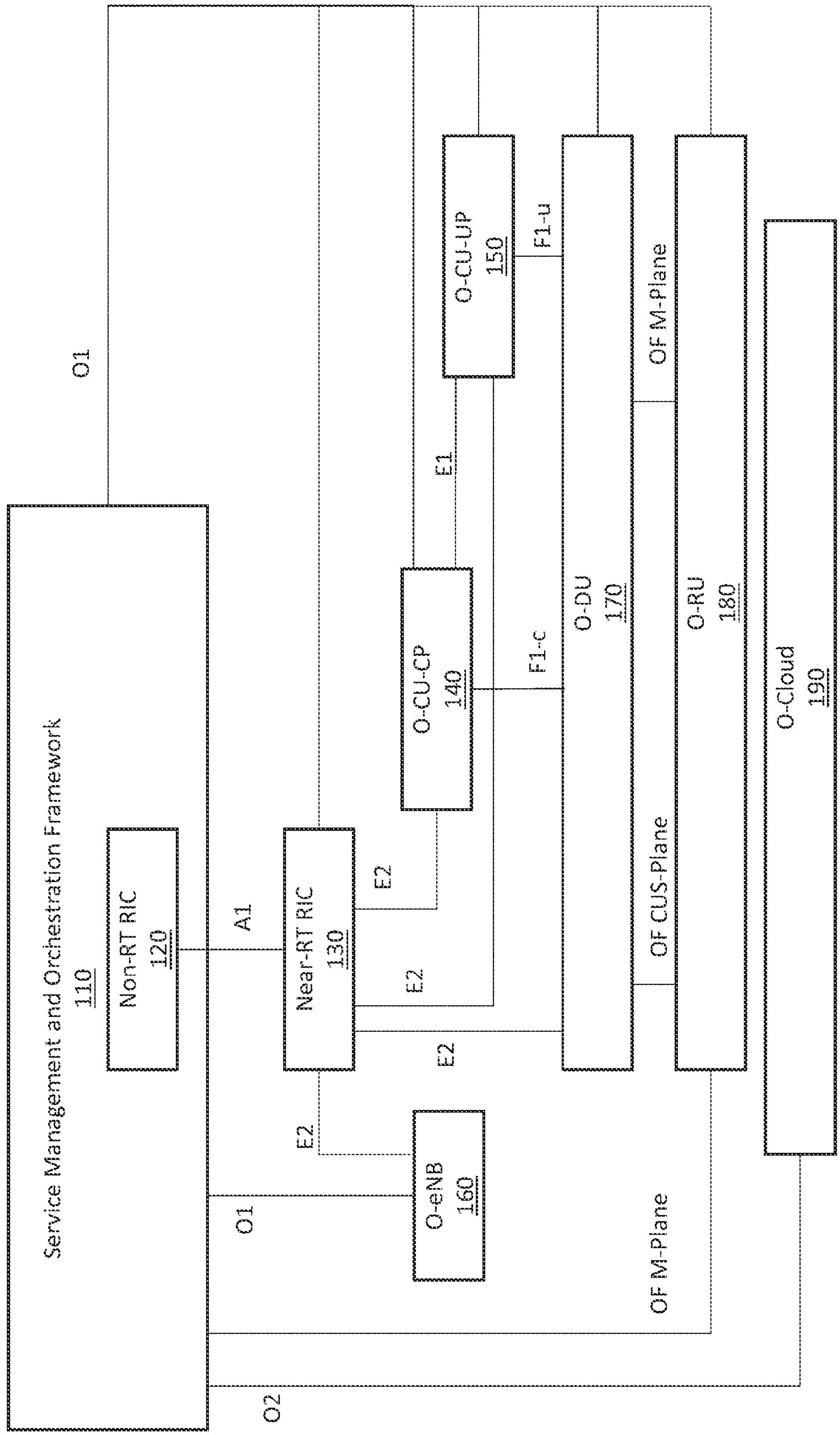
FIG. 1 illustrates an O-RAN architecture in the related art.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

It shall be noted that, descriptions of example embodiments of the present disclosure may include terms and names defined in one or more standard organizations, such as the 3rd Generation Partnership Project (3GPP) standard organization, the European Telecommunications Standards Institute (ETSI) standard organization, the Open RAN (O-RAN) Alliance, and the like. For instance, technological or functional terms describing the example embodiments, and the like, as well as the associated features and operations, are to be interpreted as consistent with those technological or functional terms specified in one or more telecommunication standard specifications (e.g., 3GPP, ETSI, O-RAN Alliance, etc.) unless described otherwise.

Exemplary embodiments of the present disclosure provide an O-DU that applies the supported sleep mode type via a C-Plane Section Type 4 message or M-Plane command to the O-RU and an O-RU that activates the sleep mode type to parts of the O-RU based on the supported sleep mode type from the O-DU. Thereby, the O-DU and the O-RU enable maximum power savings to be achieved by powering down parts of the O-RU based on supported sleep mode types as provided by the O-DU, wherein the O-DU being aware of the O-RU configuration capability information.

Figure 2:
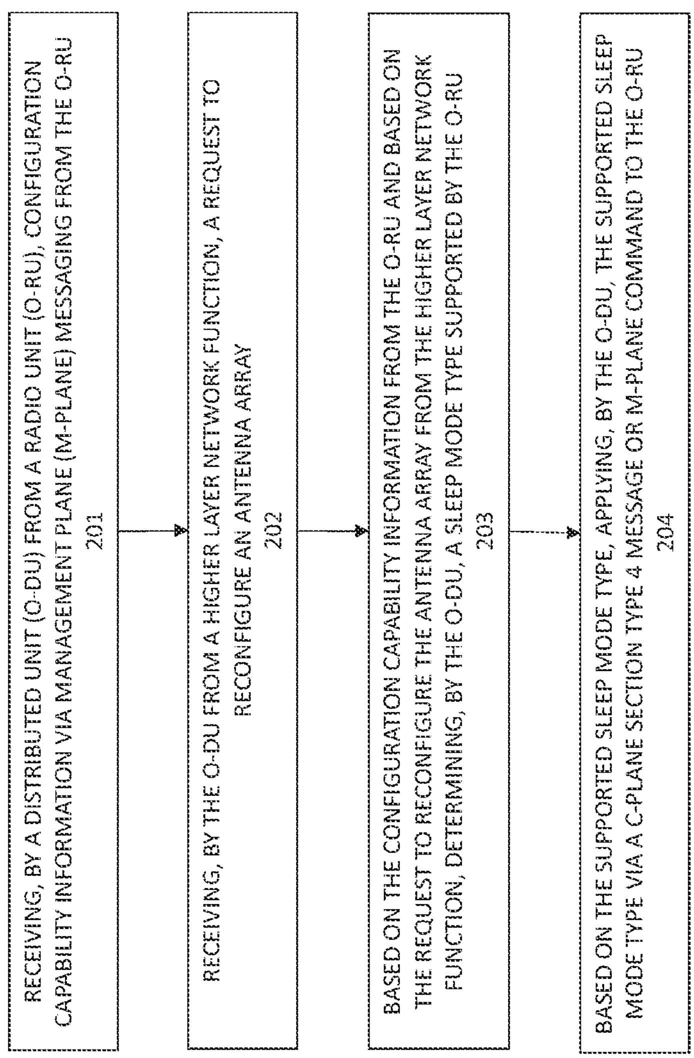
FIG. 2 illustrates a method for sleep mode implementation by Control-Plane Section Type 4 Messaging from the perspective of an O-DU according to an embodiment.

FIG. 2 illustrates a method for optimizing antenna array model selection in an O-RAN from the perspective of an O-DU. Referring to FIG. 2, in step 201, the O-DU receives, from a radio unit (O-RU), capability information via management plane (M-Plane) messaging. For example, the O-RU reports configuration capability information such as supported network energy-saving (i.e., ES or NES) modes by O-RU-urn:o-ran: module-cap:1.0.

For example, the antenna configuration capability information may be hardcoded by the vendor during production along with at least one of the following parameters, a unique name, index, reference, etc. to identify the antenna array configuration capability (e.g., the technical specification of the antenna array), the number of spatial streams/layers supported against each configuration of the antenna array, the antenna calibration data to be applied by O-RU during the configuration change, a value referring to the achievable energy-savings against each configuration, associated beam weights (pre-defined beam weights), etc. In an example embodiment, when O-RU is powered on (is initialized), the O-RU starts reporting supported energy-saving modes (i.e., antenna array configuration capability information) and the hardcoded antenna array models along with the other initialization parameters to the O-DU using M-Plane yang models (e.g., an urn:o-ran:module-cap:1.0 and an urn:o-ran:hardware:1.0).

In an example embodiment, the energy-saving-by-transmission-blanks parameter may be used for sending configuration capability information from the O-RU to the O-DU. This allows the use of existing M-Plane models, to provide (i.e., define) new parameters to enable the O-RU to report new energy-saving parameters (e.g., energy-saving-by-rf-channel-reconfiguration, energy-saving-by-advanced-sleep-modes, energy-saving-by-modify-no-of-spatial-streams, etc.).

An example of energy-saving-by-transmission-blanks parameter in a M-Plane model may be as follows:

```
leaf energy-saving-by-transmission-blanks {type
boolean;
mandatory true;
description
"Parameter informs if unit supports energy-saving by
  transmission blanking";
}
grouping Energy-saving-method {
status active;
description
"Grouping for energy-saving method.
Note: This grouping is meant for energy-saving meth-
  ods.";
leaf energy-saving-method {
type enumeration {
enum RF CHANNEL RECONFIGURATION {descrip-
  tion
"RF Channel Reconfiguration will be used";
}
enum ADVANCED SLEEP MODE {
description
"Advanced Sleep Mode will be used";
}
emum MODIFY NO OF SPATIAL STREAMS {
description
"No of Spatial Streams will be modified";
}
}
description
"Energy-saving method which can be supported by the
  O-RU.
An O-RU may further refine the applicability of energy-
  saving
methods per endpoint using o-ran-uplane-conf.yang
  model";
}
}
leaf energy-saving-by-RF-channel-reconfiguration {
type boolean;
mandatory true;
description
"Parameter informs if unit supports energy-saving by RF
  channel reconfiguration";
}
  leaf energy-saving-by-Advanced-Sleep-Mode {
type boolean;
mandatory true;
description
"Parameter informs if unit supports energy-saving by
  Advanced sleep mode";
}
  leaf energy-saving-by-modify-no-of-spatial-streams {
type boolean;
mandatory true;
description
"Parameter informs if unit supports energy-saving by
  Modifying no of spatial streams/layers";
}
container eaxcid-grouping-capabilities {
if-feature o-ran-module-cap: EAXC-ID-GROUP-SUP-
  PORTED;
```

Regarding existing M-Plane yang models, to ensure backward compatibility, the O-RU may flag the above-mentioned energy-saving mode to false, if the O-RU does not support custom configurations or RF channel reconfigurations/antenna array selection approach for ES.

In another example embodiment, O-RU configuration capability information may comprise supported features such as, for example, supported energy-saving features in o-ran-wg4-features.yang. The O-RU may indicate the supported energy-saving features in the o-ran-wg4-features.yang to O-RU controller (i.e., the O-DU or the higher-layer network functions (e.g., the SMO)).

According to an embodiment, in line with the O-RAN Open Fronthaul M-Plane Specification, which defines the Management Plane of the Open Fronthaul Interface as well as associated YANG models, the O-RU may indicate the supported energy-saving features in associated YANG models a Yang Features such as, for example, o-ran-wg4-features.yang, to an O-RU controller such as the O-DU and/or higher order network function (i.e., the SMO, etc.).

To this end, the O-RU configuration capability information may comprise O-RU-supported feature capabilities using YANG Feature Name Tags such as, for example, TRX-CONTROL, TRX-ON-OFF, ADVANCED-SLEEP-MODE, SLEEP-MODE, LIGHT-HIBERNATE-SLEEP, DEEP-HIBERNATE-SLEEP (i.e., DEEP SLEEP), etc.

The YANG Feature Name Tags TRX-CONTROL or TRX-ON-OFF may describe the turning on/off RF channels or Tx/Rx array elements (i.e., of RF channels or Tx/Rx array elements switch on or off), whereas an M-Plane activation as optional feature control may be not available.

The YANG Feature Name Tags ADVANCED-SLEEP-MODE or SLEEP-MODE may describe turning off carriers and associated O-RU circuit(s) and/or O-RU component(s) (i.e., muting and/switching on/off physical and functional components of the O-RU) based on the respective activated sleep mode, whereas an M-Plane activation as optional feature control may be not available.

The YANG Feature Name Tag HIBERNATE-SLEEP may describe an O-RU Energy-saving by turning off carriers and associated O-RU circuits/components for a longer duration, wherein the longer duration in comparison to other sleep modes allows an optional feature control to be implemented hardware/component/energy-saving-enabled as an M-Plane based sleep mode.

The YANG Feature Name Tag LIGHT-HIBERNATE-SLEEP may describe O-RU Energy-saving by turning off carriers and associated O-RU circuits/components for a longer duration without turning off synchronization, wherein the longer duration in comparison to other sleep modes allows an optional feature control to be implemented hardware/component/energy-saving-enabled as a M-Plane based sleep mode.

The YANG Feature Name Tag DEEP-HIBERNATE-SLEEP (i.e., DEEP SLEEP) may describe O-RU Energy-saving by turning off carriers and associated O-RU circuits/components for a longer duration by turning off synchronization, wherein the longer duration in comparison to other sleep modes allows an optional feature control to be implemented hardware/component/energy-saving-enabled as a M-Plane based sleep mode.

According to an example embodiment, referring to the YANG Feature Name Tags ADVANCED-SLEEP-MODE or SLEEP-MODE may define various short duration (C Plane based) sleep modes, for example, the advanced sleep mode may be for shorter sleep duration like milliseconds, seconds, or minutes and activated, for example, with ST4 C Plane message by Control Plane (C-Plane) messaging.

According to an example embodiment, referring to the YANG Feature Name Tag HIBERNATE-SLEEP for longer duration a hibernate-sleep mode may be activated by employing M-Plane, for example, by setting the parameter +--rw energy-saving-enabled? boolean {ENERGYSAVING}? in the respective o-ran-hardware.yang module to "True" or "Yes".

According to an example embodiment, referring to the YANG Feature Name Tags LIGHT-HIBERNATE-SLEEP and DEEP-HIBERNATE-SLEEP in order to differentiate the longer sleep with and without turning off synchronization plane circuit, light-hibernate-sleep mode with synchronization and deep-hibernate-sleep mode without synchronization may be implemented in a same way as that of hibernate-sleep by employing the M-Plane, for example, by setting the parameter+-rw energy-saving-enabled? boolean {ENERGYSAVING}? in the respective o-ran-hardware.yang module to "True" or "Yes".

Referring to the O-RU reporting to the O-DU (i.e., the receiving of O-RU configuration capability information by the O-DU) based on yang modules such as, for example, as specified in the o-ran module.cap.yang, Advanced Sleep Modes (ASM) may support sleep modes (SM) having a short duration (C-Plane based) sleep modes (e.g., a plurality of Sleep modes such as, for example, SM #0, SM #1, SM #2, SM #3, etc., wherein the time duration of SM #0<SM #1<SM #2<SM #3) with different wake-up times or if the wake-up times is too short a defined go-to-sleep time. Moreover, the Advanced Sleep Modes (ASM) may support sleep modes having a long duration (M-Plane based) sleep modes (e.g., the hibernate sleep that does not involve any synchronization or the hibernate sleep modes with or without synchronization, whereas the light hibernate sleep refers to a M-Plane based sleep mode with synchronization and the deep hibernate sleep refers to a M-Plane based sleep mode without synchronization.

According to an embodiment, the Advanced Sleep Modes (ASM) have a wake-up time (minimum or guaranteed) per sleep mode. The shortest of the C-Plane-based sleep modes (e.g., SM #0) may be not defined by a minimum or guaranteed wake-up time but by go-to-sleep time.

The O-RU reporting to the O-DU and/or SMO based on yang modules such as, for example, as specified in the o-ran module.cap.yang, may also support of C-Plane messages such as Section Type 8 (ST8) "ready" message and C-Plane messages including a command scope (e.g., CARRIER-COMMAND, ARRAY-COMMAND, O-RU-COMMAND) such as, for example, a Section Type 4 (ST4) message.

According to an example embodiment, the TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a 'O' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

To this end, the O-RU may report its capabilities via a Yang model o-ran-module-cap.yang for TRx control and data layer control. The Yang model o-ran-module-cap.yang may include the parameter following the summary.

```
o-ran-module-cap.yang - TRx control and data layer control
module: o-ran-module-cap
+--rw module-capability
   +--ro ru-capabilities
//TRx control - Capability reporting
|+--ro trx-control-capability {or-feat: TRX-CONTROL}?
||           +--ro number-of-supported-trx-control-configuration? Uint8 //number of supported
TRx control configuration.
   ||      +--ro supported-trx-control-configuration* [name]
||        |          +--ro configuration-name
   string //unique name of each TRx control configuration
||        |          +--ro antenna-mask?
   binary or bits //antMask list - antenna mask per TRx control config for all
||        |          +--ro antenna-layer-mask?
   binary or bits //antLayerMask list - antenna layer mask per TRx control config for all
||        |          +--ro transition-time or wake-up-time         uint32
   //transition time (list) associated with each configuration change for the supported TRx
```

-continued

```
control configurations and as a function of sub carrier spacing. Since for 15 KHz, 1 slot is 1
milli second, and for 30 KHz, 1 slot is 0.5 milli second or 500 micro-seconds
||        |         +--ro energy-saving-ratio
  uint8           //percentage of energy-saving per TRx control configuration
//data-layer/spatial streams control - Capability reporting
|   +--ro data-layer-control-supported? boolean {or-feat:TRX-CONTROL}? //Data layer
control/limiting no of spatial streams supported by O-RU or not?
```

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model or a 64TRx_antenna array model). The transition time (i.e., wake-up time) associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the O-Ru may report data layer control capability or the capability of limiting of number of spatial streams by a Yang model o-ran-module-cap.yang as set forth above for at least one supported (i.e., given) antenna configuration.

In an example embodiment, the TRx of an antenna array (e.g., a 64T64R antenna array) may be kept active, whereas the gain (i.e., energy-saving gain) may be realized from the turning off O-RU processing equipment by changing the number of data layers/spatial streams. According to an example embodiment, the TRx control methods may include a control to turn on/off entire RF Transceiver chains and/or Radio Frequency Front End (RFFE) of Radio Frequency (RF) processing unit pertaining to some of the RF channels/ antenna elements.

Moreover, according to another example embodiment, the TRx control methods may include a control to turn on/off Components, Circuits, IPs, Cores, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having long duration (M-Plane based) sleep modes the wake-up latency (i.e., the wake-up time or the go-to-sleep time) for said ASM and the wake-up latency of the TRx control may be different and not interfere with (e.g., hinder) each other.

The O-RU reporting to the O-DU and/or SMO based on yang modules such as, for example, as specified in the o-ran module.cap.yang, may also support sleep duration extension and emergency wake-up by M-Plane and/or C Plane messaging.

Moreover, the O-RU reporting to the O-DU and/or SMO based on yang modules such as, for example, as specified in the o-ran module.cap.yang may also provide information such as the percentage of achievable energy-savings.

Furthermore, the O-RU reporting to the O-DU and/or SMO based on yang modules such as, for example, as specified in the o-ran module.cap.yang, may also support a notification messaging for CU-Plane active or inactive state, such as, for example, support a notification that may be required to ensure the CU-Plane become active after sleep duration expires (i.e., a CU-Plane circuit may be turned off in the case of defined, undefined, and/or longer sleep duration). To this end, the O-RU reporting to the O-DU and/or SMO supports notifications from O-RU to O-DU about CU-Plane status in case it is turned off during any of the sleep mode activations.

In general, the o-ran-module-cap.yang relates to common O-RU capabilities (i.e., O-RU configuration capability information for sleep modes (e.g., advanced sleep modes), CU-Plane status reporting to implement the sleep modes (e.g., advanced sleep modes) and TRx control methods.

To this end, the o-ran-module-cap.yang among other YANG models may comprise all necessary information to implement an antenna array configuration supported by the O-RU (i.e., based on said O-RU configuration capability information).

According to an example embodiment, the o-ran-module-cap.yang among other YANG models for TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

The Yang model o-ran-module-cap.yang may include the parameters according to the following summary.

```
o-ran-module-cap.yang—Advanced sleep mode
module: o-ran-module-cap
+--rw module-capability
   +--ro ru-capabilities
|+--ro max-num-component-carriers? uint8
|x--ro max-num-bands? uint16
//Advanced sleep mode—Capability reporting
|+--ro advanced-sleep-mode-capability? enumeration {or-
   feat: ADVANCED-SLEEP-MODE}?
||=+--ro supported-sleep-modes*[name]//list of supported
   sleep modes like sleep mode 0, 1, 2, and 3 (SM #0-3)
|||+--ro sleep-mode-name
   string//sleepMode0 (SM #1), sleepMode1 (SM #2),
      sleepMode2 (SM #2), and sleepMode3 (SM #3)
|||+--ro wake-up-time
   uint32//wake-up time list (minimum or guaranteed)
      associated with each sleep mode and represented in
      slots as a function of Sub carrier spacing. For e.g.,
      SM #1-L slots, SM #2-M slots, and SM #3-N slots.
      The wake-up time in slots is listed for all supported
      sub-carrier spacing by O-RU. Since for 15 KHz, 1
      slot is 1 milli second, and for 30 KHz, 1 slot is 0.5
      milli second or 500 microseconds.
|||+--ro energy-saving-ratio
   uint8//percentage of energy-saving per sleep mode
|+--ro hibernate-sleep-capability {or-feat:HIBERNATE-
   SLEEP}?//option #1: longer sleep duration
```

||+--ro hibernate-wake-up-time or wake-up-time-hibernate uint32//wake-up time in milli seconds for hibernate sleep

|+--ro light-hibernate-sleep-capability {or-feat: LIGHT-HIBERNATE-SLEEP}?//option #*2a*: longer sleep duration with synchronization

||+--ro lh-wake-up-time or wake-up-time-lh uint32//wake-up time in milli seconds for light hibernate sleep

|+--ro deep-hibernate-sleep-capability {or-feat: DEEP-HIBERNATE-SLEEP}?//option #*2b*: longer sleep duration without synchronization

||+--ro dh-wake-up-time or wake-up-time-dh uint32//wake-up time in milli seconds for deep hibernate sleep

||+--ro supported-command-scope*enumeration//supported ST4 command scope such as "CARRIER-COMMAND, ARRAY-COMMAND, O-RU-COMMAND" to be reported by O-RU. For e.g., one or two or all three

||+--ro st8-ready-msg-supported? boolean//O-RU already reports the support of Section Type (ST) 8 message in supported-section-types, hence in NES perspective support of "ready" command in ST8 message to reported by O-RU as a capability

||+--ro sleep-duration-extension-supported? boolean//in defined sleep, if O-DU wants to extend the ongoing sleep it can issue sleep extension C Plane command (short sleep duration) and M Plane command (long sleep duration). The supported of this could be advertised by O-RU as an optional.

||+--ro emergency-wake-up-by-cplane-command-supported? boolean//(in defined (not guaranteed) or undefined sleep duration, O-DU could any time interrupt the sleep by issuing emergency wake-up C Plane command, provided CU-Plane remain active or CU-Plane circuit ON. This support could be advertised by O-RU as an optional.

||+--ro emergency-wake-up-by-mplane-command-supported? boolean//(in defined (not guaranteed) or undefined sleep duration, O-DU could any time interrupt the sleep by issuing emergency wake-up command via M Plane as CU-Plane is turned off. This support could be advertised by O-RU as optional.

Referring to the summary above, the Common O-RU capabilities may be for both TRx control and Advanced sleep mode.

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time (i.e., wake-up time) associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, IPs, Cores, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having long duration (M-Plane based) sleep modes the wake-up latency (i.e., the wake-up time or the go-to-sleep time) for said ASM and the wake-up latency of the TRx control methods may be different and not interfere with (e.g., hinder) each other.

Moreover, regarding common capability parameters to be reported by O-RU configuration capability information to the O-DU via M-Plane for both TRx control methods and sleep modes (e.g., advanced sleep modes) may include C-Plane ST8 "ready" messages and sleep duration extension (e.g., in case of defined sleep, if the O-DU needs to extend a sleep mode it send a sleep extension command just before the start of wake-up time). In case the CU-Plane remains active, the extension command may be C-Plane based for short sleep durations. In case the CU-Plane is turned off the extension command may be M-Plane based for long sleep durations.

Furthermore, regarding common capability parameters to be reported by O-RU configuration capability information to the O-DU via M-Plane for both TRx control methods and sleep modes (e.g., advanced sleep modes) may include an emergency wake-up of O-RU from sleep. This capability may be reported by O-RU via M-Plane. For example, in case of sleep mode interruption, if the O-DU needs to interrupt a sleep mode it sends a sleep mode interruption command. In case the CU-Plane remains active, the emergency wake-up command may be C-Plane-based for short sleep durations (defined or undefined). In case the CU-Plane is turned off the emergency wake-up command may be M-Plane-based for long sleep durations (defined or undefined).

According to an example embodiment, when a sleep mode is activated for a predefined duration, the CU-Plane processing unit can be shut down. The CU-Plane processing unit then wakes up after the sleep duration has ended.

The CU-Plane processing unit may be turned off if the sleep duration is significantly longer than the wake-up duration of the CU-Plane processing unit.

Moreover, when the O-RU is in sleep mode for a predefined duration, the CU-Plane processing unit is turned off and if the O-DU needs to interrupt the sleep, it can send the M-Plane wake-up command (i.e., the emergency wake-up command) to the O-RU to wake up the CU-Plane processing unit.

In response to the above Wake-up command, the O-RU can send the notification to O-DU to indicate the CU-Plane processing unit wake-up is complete.

According to an example embodiment, the o-ran-module-cap.yang among other YANG models for CU-Plane status reporting (e.g., to implement O-RU capabilities for defined and undefined sleep modes). The o-ran-module-cap.yang comprises information to enable a CU-Plane circuit to be turned off to attain additional energy-saving. The information may include a name identifier and a status identifier of the rx-array-carriers as well as a name identifier, action identifier and state for the cu-plane in order to report the user plane configuration. Based on the above information, the O-DU may turn on or wake-up CU-Plane circuit through the M-Plane. According to an example embodiment, a notification is needed to indicate if CU-Plane become active or not (wake-up from sleep), the same may be defined in the o-ran-uplane.yang, respectively.

The Yang model o-ran-uplane.yang may include the parameter according to the following summary.

o-ran-uplane-conf.yang
+--ro rx-array-carriers*[name]
+--ro name→/user-plane-configuration/rx-array-carriers/name
+--ro state?→/user-plane-configuration/rx-array-carriers/state
+---n cu-plane-state-change
+--ro cu-plane [name]
+--ro active?→/user-plane-configuration/cu-plane/active; Active/Inactive
+--ro state?→/user-plane-configuration/cu-plane/state: Enabled/Disabled According to an example embodiment for the use case RF Channel Reconfiguration (i.e., RF Channel Switch Off/On) a sub-use case may be defined as TRx Control (i.e., a Tx array control and Rx array control may be claimed separately since antenna masks may be defined per array level. For this sub-use case, the O-RU may include at least one of the following capability reporting (i.e., configuration capability information). The configuration capability information may include among other capability reporting at least the reporting of support of a C-Plane and a M-Plane based TRx control activation/deactivation, the reporting of a list of supported antenna array configuration/TRx control configurations (e.g., valid antenna mask values (per antenna array configuration values) along with unique name, the reporting of wake-up time/duration as a function of SCS (Sub-carrier spacing) (i.e., this wake-up may be different from the wake-up time/duration reported for Advanced sleep mode), the reporting of the support of TRx control sleep modes, the reporting of the amount of achievable energy-saving/power saving/energy-saving ratio per antenna array configuration (Tx array and/or Rx array) or TRx control (Tx control and/or Rx control), the reporting of the support of defined and undefined duration sleep, ST8 ready message, sleep duration extension, and emergency wake-up and the reporting of the O-RU internal architecture (functional blocks) using valid yang data model parameters to attain maximum energy-savings (i.e., exposing the O-RU internal architecture).

According to another example embodiment for the use case RF Channel Reconfiguration (i.e., RF Channel Switch Off/On) a sub-use case may be defined as Data layer Control. For this sub-use case, the capability reporting (i.e., configuration capability information) may include a list of maximum supported spatial streams/data layers per antenna array (TRx Control) configuration.

According to another example embodiment, a use case may be defined as Advanced Sleep Mode. For this sub-use case, the O-RU may include at least one of the following capability reporting (i.e., configuration capability information). The configuration capability information may include among other capability reporting at least the reporting of a wake-up duration associated with each sleep mode as a function of the SCS, the reporting of the amount of achievable energy-saving per sleep mode type, the reporting of the support of defined and undefined duration sleep, ST8 ready message, sleep duration extension, and emergency wake-up.

According to another example embodiment for the use case, RF Channel Reconfiguration (i.e., RF Channel Switch Off/On) a sub-use case may be defined as Hibernate sleep. For this sub-use case, the O-RU may include at least one of the following capability reporting (i.e., configuration capability information). The configuration capability information may include among other capability reporting at least the reporting of support of Hibernate sleep such as long duration sleep (light/deep sleep), the reporting of support of removal/de-configuring the carriers by the O-RU during long sleep, the reporting of support of turning off the C-Plane, U-Plane, S-Plane, and M-Plane processing units (i.e., the support of an O-DU request (e.g., by sending appropriate RPC(s)) or by the O-RU's internal logic)).

In step 202, the O-DU receives the request to reconfigure an antenna array from the higher-layer network function. The request to reconfigure an antenna array is based on a monitored network parameter satisfying a predetermined condition. In an example embodiment, the higher-layer network function may determine whether a current network parameter (e.g., a current network parameter reflected by the O1-related KPIs such as, for example, throughput, number of users in a cell, user statistics, etc.) is satisfying a predetermined condition (i.e., a predetermined threshold that relates to O-RAN network condition). The predetermined network parameter may be based on a Rank Indicator (RI) value shared by a UE, traffic scenarios, etc. that can be derived by said O1 interface related KPIs (i.e., throughput, number of users in a cell, user statistics, etc.).

In step 203, the O-DU determines a sleep mode type supported by the O-RU. The determined sleep mode type is based on the configuration capability information from the O-RU and based on the request to reconfigure the antenna array from the higher-layer network function as set forth above.

In FIG. 2, the configuration capability information may further comprise wake-up latency information for sleep mode types, wherein the wake-up latency information advertising L slots for a first sleep mode type SM1, M slots for a second sleep mode type SM2, and N slots for a third sleep mode type SM3 via M-Plane messaging.

In step 204, the O-DU applies the supported sleep mode type via a C-Plane Section Type 4 message or M-Plane command to the O-RU (i.e., via a C-Plane Section Type 4 message or M-Plane command for activating (i.e., applying) the supported sleep mode type.

According to the example embodiments as set forth above in step 201, sleep modes may be a control plane (C-Plane) or management plane (M-Plane) compatible depending on the sleep duration.

According to example embodiments of the Advanced Sleep Modes (ASM) having short duration (C-Plane based) sleep modes and sleep modes having a long duration (M-Plane based) sleep modes the wake-up latency (i.e., the wake-up time or the go-to-sleep time) for said ASM and the wake-up latency of the TRx control methods may be different and not interfere with (e.g., hinder) each other.

Alternatively in a further step, the O-DU receives, via a response C-Plane messaging or response M-Plane messaging (i.e., a via C-Plane messaging or M-Plane messaging that is different from a C-Plane messaging or a M-Plane messaging for activating (i.e., applying) an antenna array model change based on to the supported antenna array configuration comprising the at least one antenna array model parameters) from the O-RU.

The C-Plane messaging or M-Plane messaging is a response to an antenna array configuration change to the supported antenna array configuration. In an example embodiment, the C-Plane messaging may be an acknowledgment message of the antenna array configuration change to the supported antenna array configuration. In another example embodiment, the M-Plane messaging may be a notification of the antenna array configuration change to the supported antenna array configuration.

Figure 3:
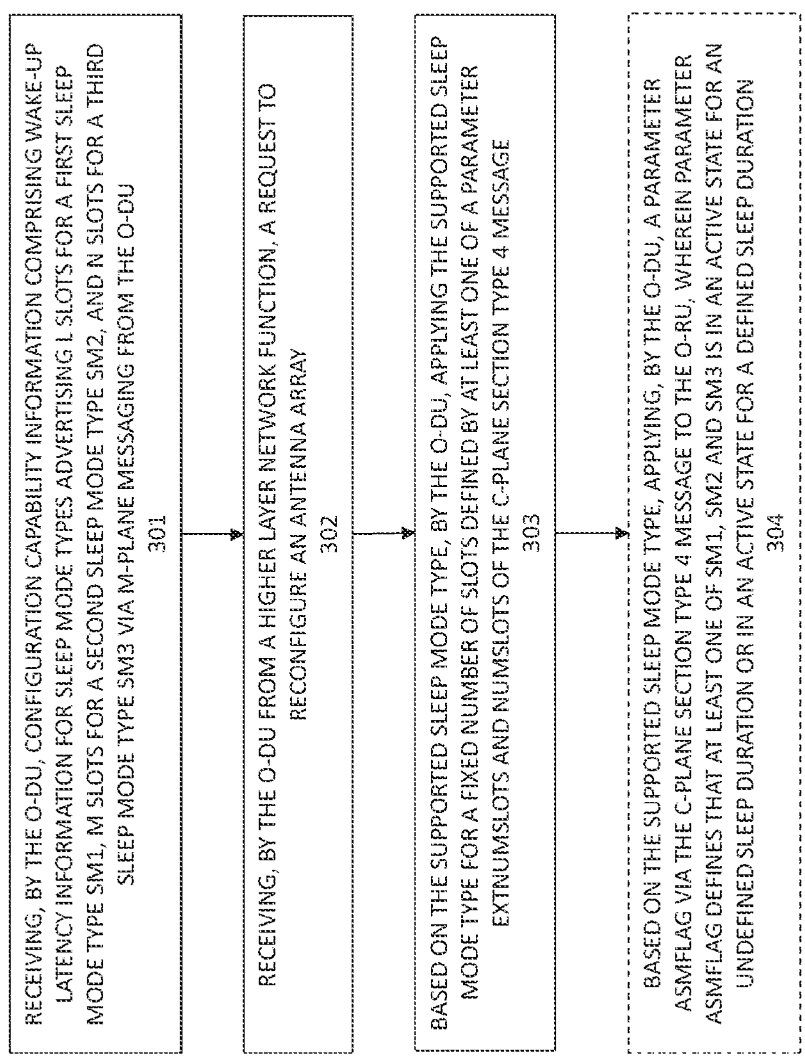
FIG. 3 illustrates a method using Wake-up Latency Information for sleep mode implementation by a parameter asmflag via the C-Plane Section Type 4 message according to an embodiment.

FIG. 3 illustrates a method using Wake-up Latency Information for sleep mode implementation by a parameter asmflag via the C-Plane Section Type 4 message. Referring to FIG. 3, in step 301, the O-DU receives configuration capability information that includes wake-up latency information for sleep mode types, wherein the wake-up latency information advertising L slots for a first sleep mode type SM1, M slots for a second sleep mode type SM2, and N slots for a third sleep mode type SM3 via M-Plane messaging from the O-DU.

An example embodiment for O-RU configuration capability information comprising wake-up latency information advertising slots:

| Sleep Mode | Time Duration (Minimum Sleep Duration) | Minimum No of Slots | |
|---|---|---|---|
| | | O-RU-X | O-RU-Y |
| Sleep Mode #0 (SM0) | Symbol to Slot | — | Not supported |
| Sleep Mode #1 (SM1) | L Slots (1 Slot) | 1 slot | 5 slots |
| Sleep Mode #2 (SM2) | M Slots (Radio Frame (10 ms)) | 10 slots | 15 slots |
| Sleep Mode #3 (SM3) | N Slots (100 ms) | 100 slots | 2000 slots |
| Sleep Mode #4 (SM4) | Undefined time (1 min) | 60000 slots | 70000 slots |

An another example embodiment for O-RU configuration capability information comprising wake-up latency information advertising slots:

| Sleep Mode # | SCS, KHz | Mul | SleepDur | Sleep Duration ($T_{sleep}$) Lower limit | Upper limit | Remarks |
|---|---|---|---|---|---|---|
| 0 (SM0) | NA | NA | NA | 1 Symbol | 1 Slot | Depends on O-RU capability |
| 1 (SM1) | 15 | 1 | 1 . . . 10 | 1 Slot | 10 ms (1 Radio Frame) | 1 to 10 slots |
| (Mul × | 30 | 1 | 1 . . . 20 | | | 1 to 20 slots |
| SleepDur × | 60 | 1 | 1 . . . 40 | | | 1 to 40 slots |
| $T_{slot}$) | 120 | 2 | 1 . . . 40 | | | 2 to 80 slots |
| | 240 | 4 | 1 . . . 40 | | | 4 to 160 slots |
| | 480 | 6 | 1 . . . 54 | | | 6 to 320 slots |
| | 960 | 11 | 1 . . . 60 | | | 11 to 640 slots |
| 2 (SM2) (Mul × | 15 | 1 | 0 . . . 63 | 10 ms | 100 ms | 10 to 73 slots (max: 100 slots) |
| (10× $T_{slot}$)) + (SleepDur* | 30 | 2 | 0 . . . 63 | | | 20 to 83 slots (max: 200 slots) |
| $T_{slot}$) | 60 | 4 | 0 . . . 63 | | | 40 to 103 slots (max: 400 slots) |
| | 120 | 8 | 0 . . . 63 | | | 80 to 143 slots (max: 800 slots) |
| | 240 | 16 | 0 . . . 63 | | | 160 to 223 slots (max: 1600 slots) |
| | 480 | 32 | 0 . . . 63 | | | 320 to 383 slots (max: 3200 slots) |
| | 960 | 64 | 0 . . . 63 | | | 640 to 703 slots (max: 6400 slots) |
| 3 (SM3) (Mul × | 15 | 1 | 0 . . . 63 | 100 ms | 1 min | 100 to 163 slots (max: 60,000 slots) |
| (100× $T_{slot}$)) + (SleepDur* | 30 | 2 | 0 . . . 63 | | | 200 to 263 slots (max: 1,20,000 slots) |
| $T_{slot}$) | 60 | 4 | 0 . . . 63 | | | 400 to 463 slots (max: 2,40,000 slots) |
| | 120 | 8 | 0 . . . 63 | | | 800 to 863 slots (max: 4,80,000 slots) |
| | 240 | 16 | 0 . . . 63 | | | 1600 to 1663 slots (max: 9,60,000 slots) |
| | 480 | 32 | 0 . . . 63 | | | 3200 to 3263 slots (max: 19,20,000 slots) |
| | 960 | 64 | 0 . . . 63 | | | 6400 to 6463 slots (max: 38,40,000 slots) |
| 4 (SM4) (Mul × | 15 | 6 | 0 . . . 63 | 1 min | Undefined time (To be defined by O-DU) | 60,000 slots to 60,063 slots (max: infinite time) |
| (10000× $T_{slot}$)) + (SleepDur* $T_{slot}$) | 30 | 12 | 0 . . . 63 | | | 1,20,000 slots to 1,20,063 slots (max: infinite time) |
| | 60 | 24 | 0 . . . 63 | | | 2,40,000 slots to 2,40,063 slots (max: infinite time) |
| | 120 | 48 | 0 . . . 63 | | | 4,80,000 slots to 4,80,063 slots (max: infinite time) |

-continued

| Sleep Mode # | SCS, KHz | Mul | SleepDur | Sleep Duration ($T_{sleep}$) Lower limit | Upper limit | Remarks |
|---|---|---|---|---|---|---|
| | 240 | 96 | 0 . . . 63 | | | 9,60,000 slots to 9,60,063 slots (max: infinite time) |
| | 480 | 192 | 0 . . . 63 | | | 19,20,000 slots to 19,20,063 slots (max: infinite time) |
| | 960 | 384 | 0 . . . 63 | | | 38,40,000 slots to 38,40,063 slots (max: infinite time) |

Referring to FIG. 3, the method using Wake-up Latency Information for sleep mode implementation by a parameter asmflag via the C-Plane Section Type 4 message may further comprise that the O-DU, based on the supported sleep mode type, applies the supported sleep mode type for a fixed number of slots defined by at least one of a parameter extnumSlots and numSlots of the C-Plane Section Type 4 message (i.e., applies a C-Plane Section Type 4 message (st4CmdType) 'TRX-CONTROL/ADVANCED-SLEEP-MODE' comprising at least one of a parameter extnumSlots and numSlots).

According to an example embodiment, total sleep duration in slots is the sum of slots defined by the parameters extnumSlots and numSlots as set forth above and the wake-up latency information for each sleep mode type as received, by the O-DU, via M-Plane messaging (i.e., the configuration capability information) from the O-RU.

According to another example embodiment, the method using Wake-up Latency Information for sleep mode implementation by a parameter asmflag via the C-Plane Section Type 4 message may further comprise that the O-DU, based on the application of the parameter asmflag via the C-Plane Section Type 4 message, sends a C-Plane Section Type 4 message to wake up the O-RU from, for example, the first sleep mode type SM1.

Still referring to FIG. 3, in step 302, the O-DU receives a request to reconfigure an antenna array from a higher layer network function (e.g., a network energy-saving request).

In step 303, the O-DU applies the supported sleep mode type for a fixed number of slots defined by at least one of a parameter extnumSlots and numSlots of the C-Plane Section Type 4 message (st4CmdType), wherein the supported sleep mode type is similar to the one as determined in step 203 in FIG. 2.

The method using wake-up Latency Information for sleep mode implementation by a parameter asmflag via the C-Plane Section Type 4 message in FIG. 3 has the advantage that for sleep modes with undefined sleep duration, sleep mode commands need not be sent multiple times to renew the sleep duration, which conserves the FH bandwidth. In addition, the use of wake-up latency information for sleep mode implementation through a parameter asmflag via the C-Plane Section Type 4 message provides complete flexibility for sleep mode enablement/disablement and simple implementation within standard messaging with less complexity.

Moreover, according to an alternative example embodiment, in step 304, the O-DU applies a parameter asmflag via the C-Plane Section Type 4 message to the O-RU, wherein parameter asmflag defines that at least one of SM1, SM2 and SM3 is in an active state for an undefined sleep duration or in an active state for a defined sleep duration.

Figure 4:
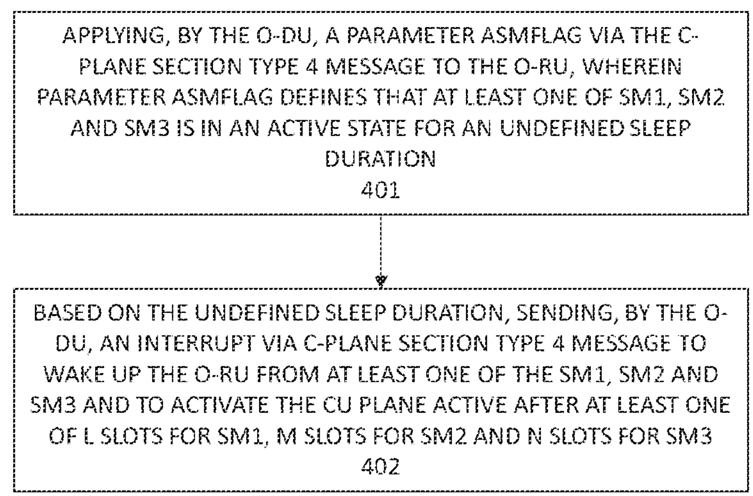
FIG. 4 illustrates a method for sending an interrupt via a C-Plane Section Type 4 message to wake up the O-RU from the first sleep mode type SM1 and to activate the CU-Plane processing unit after at least one of L slots for SM1, M slots for SM2 and N slots for SM3 according to an embodiment.

FIG. 4 illustrates a method for sending an interrupt via a C-Plane Section Type 4 message to wake up the O-RU from the first sleep mode type SM1 and to activate the CU-Plane processing unit after at least one of L slots for SM1, M slots for SM2 and N slots for SM3.

Referring to FIG. 4, in step 401, the O-DU applies a parameter asmflag via the C-Plane Section Type 4 message to the O-RU, wherein parameter asmflag defines that at least one of SM1, SM2 and SM3 is in an active state for an undefined sleep duration.

In step 402, based on the undefined sleep duration, the O-DU sends an interrupt via a C-Plane Section Type 4 message to wake up the O-RU from at least one of the SM1, SM2 and SM3 and to activate the CU-Plane processing unit after at least one of L slots for SM1, M slots for SM2 and N slots for SM3.

As a result, according to an example embodiment, the O-DU interrupts the sleep by sending at least one of the SM1, SM2 and SM3 so that CU-Plane procession unit of the O-RU gets active after at least one of L slots for SM1, M slots for SM2 and N slots for SM3, and hence O-DU can schedule the data, accordingly.

Alternatively, in step 402, according to another embodiment, based on a defined sleep duration, for a predetermined sleep duration, the O-DU applies, via M-Plane messaging, a CU-Plane wake-up command. For example, the predefined sleep duration for an SM1 may have a limit of up to 640 slots. Moreover, predefined sleep duration may be based on the sleep mode type and sub-carrier spacing as set forth above (e.g., 11 to 640 slots for the sub-carrier spacing of 960 kHz for SM1).

According to an example embodiment, when a sleep mode is activated for a predefined duration, the CU-Plane processing unit can be shut down. The CU-Plane processing unit then wakes up after the sleep duration has ended.

The CU-Plane processing unit may be turned off if the sleep duration is significantly longer than the wake-up duration of the CU-Plane processing unit.

Moreover, when the O-RU is in sleep mode for a predefined duration, the CU-Plane processing unit is turned off and if the O-DU needs to interrupt the sleep, it can send the M-Plane wake-up command (i.e., the emergency wake-up command) to the O-RU to wake up the CU-Plane processing unit.

In response to the above Wake-up command, the O-RU can send the notification to O-DU to indicate the CU-Plane processing unit wake-up is complete.

Figure 5:
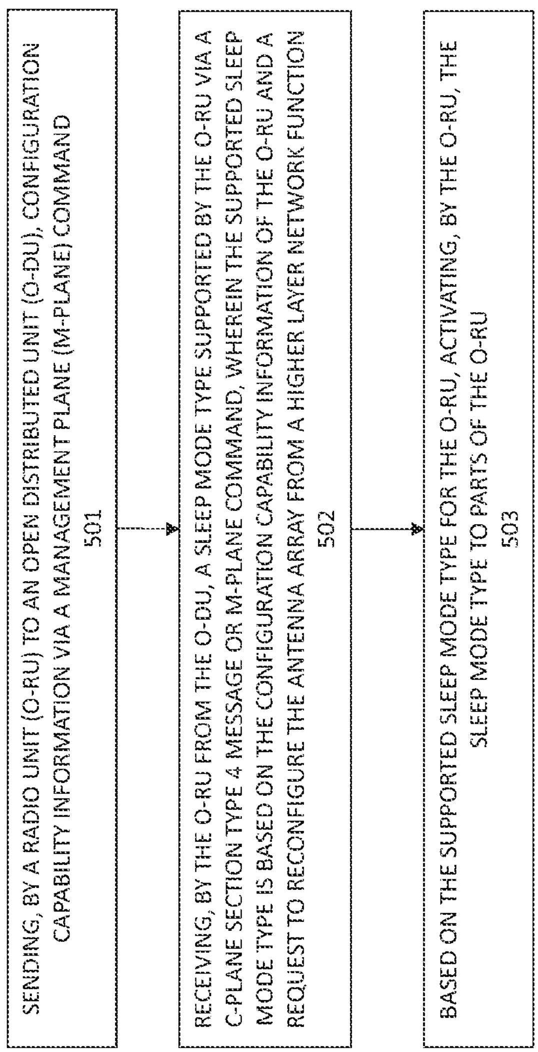
FIG. 5 illustrates a method for sleep mode implementation by Control-Plane Section Type 4 Messaging from the perspective of an O-RU according to an embodiment.

FIG. 5 illustrates a method for sleep mode implementation by Control-Plane Section Type 4 messaging from the perspective of an O-RU. Referring to FIG. 5 the O-RU communicates (e.g., sends upon initialization and/or during operation) its configuration capability information required to perform an antenna array reconfiguration via the M-Plane to the O-DU, receives (from the O-DU) an antenna array configuration supported by the O-RU via control plane (C-Plane) messaging or management plane (M-Plane) messaging and reconfigures the antenna array antenna model based on the supported antenna array configuration for the O-RU.

In step 501, the O-RU sends configuration capability information via a management plane (M-Plane) command. According to an example embodiment, in step 201, upon powering up, the O-RU communicates (e.g., sends) its configuration capability information comprising wake-up latency information for sleep mode types (i.e., Yang model data parameter comprised by a Yang model) required to perform an antenna array reconfiguration via the M-Plane to the O-DU, wherein, the wake-up latency information advertising L slots for a first sleep mode type SM1, M slots for a second sleep mode type SM2, and N slots for a third sleep mode type SM3 via M-Plane messaging.

In another example embodiment, the O-RU, during start-up, exposes (reports) its capability data (including the antenna configuration capability information) to the O-DU via the Fronthaul (FH) interface to support various ES methods (e.g., TRx control methods such as, for example, the RF channel reconfiguration, antenna array selection, etc. and sleep modes such as, for example, advance sleep mode, etc.). In another example embodiment, the O-RU communicates (e.g., sends) a plurality of supported antenna models (e.g., antenna models defined by antenna array model parameter)/configurations (i.e., antenna configuration capability information) through the M-Plane to the O-DU.

In another example embodiment, the O-RU, during operation, communicates (e.g., sends) its configuration capability information required to perform an antenna array reconfiguration via the M-Plane to the O-DU. For example, the higher-layer network function may perform a rollback of an ES method from an energy-saving network state to an original network state (e.g., it turns on an O-RU or parts of the O-RU). In another case, the higher-layer network function may perform a rollback of an ES method from an energy-saving network state or an original state to a high-performance network state (e.g., it switches on an idling O-RU or parts of idling O-RU to maximum performance).

According to an example embodiment, the antenna configuration capability information (O-RU antenna configuration capability information) may be hardcoded by the vendor during production along with at least one of the following parameters, a unique name, index, reference, etc. to identify the antenna array configuration capability (e.g., the technical specification of the antenna array), the number of spatial streams/layers supported against each configuration of the antenna array, the antenna calibration data to be applied by O-RU during the configuration change, a value referring to the achievable energy savings against each configuration, associated beam weights (pre-defined beam weights), etc. In an example embodiment, when O-RU is powered on (is initialized), the O-RU starts reporting supported energy saving modes (i.e., antenna array configuration capability information) and the hardcoded antenna array models along with the other initialization parameters to the O-DU using M-Plane yang models (e.g., an urn:o-ran:module-cap:1.0 and an urn:o-ran:hardware:1.0).

According to an embodiment, in line with the O-RAN Open Fronthaul M-Plane Specification, which defines the Management Plane of the Open Fronthaul Interface as well as associated YANG models, the O-RU may indicate the supported energy-saving features in associated YANG models a Yang Features such as, for example, o-ran-wg4-features.vang, to a lower order network function other than O-RU and/or higher order network function (i.e., an O-RU controller such as the O-DU and/or the SMO, SMO framework, etc.).

To this end, the O-DU may identify O-RU-supported feature capabilities using YANG Feature Name Tags such as for example, TRX-CONTROL, TRX-ON-OFF, ADVANCED-SLEEP-MODE, SLEEP-MODE, LIGHT-HIBERNATE-SLEEP, DEEP-HIBERNATE-SLEEP, etc.

The YANG Feature Name Tags TRX-CONTROL or TRX-ON-OFF may describe the turning on/off RF channels or Tx/Rx array elements (i.e., of RF channels or Tx/Rx array elements switch on or off), whereas an M-Plane activation as an optional feature control may be not available.

The YANG Feature Name Tags ADVANCED-SLEEP-MODE or SLEEP-MODE may describe turning off carriers and associated O-RU circuit(s) and/or O-RU component(s) (i.e., muting and/switching on/off physical and functional components of the O-RU) based on the respective activated sleep mode, whereas an M-Plane activation as optional feature control may be not available.

The YANG Feature Name Tag HIBERNATE-SLEEP may describe an O-RU Energy saving by turning off carriers and associated O-RU circuits/components for a longer duration, wherein the longer duration in comparison to other sleep modes allows an optional feature control to be implemented hardware/component/energy-saving-enabled as a M-Plane based sleep mode.

The YANG Feature Name Tag LIGHT-HIBERNATE-SLEEP may describe O-RU Energy saving by turning off carriers and associated O-RU circuits/components for a longer duration without turning off synchronization, wherein the longer duration in comparison to other sleep modes allows an optional feature control to be implemented hardware/component/energy-saving-enabled as a M-Plane based sleep mode.

The YANG Feature Name Tag DEEP-HIBERNATE-SLEEP may describe O-RU Energy saving by turning off carriers and associated O-RU circuits/components for a longer duration by turning off synchronization, wherein the longer duration in comparison to other sleep modes allows an optional feature control to be implemented hardware/component/energy-saving-enabled as a M-Plane based sleep mode.

According to an example embodiment, referring to the YANG Feature Name Tags ADVANCED-SLEEP-MODE or SLEEP-MODE may define various short duration (C Plane based) sleep modes, for example, the advanced sleep mode may be for shorter sleep duration like milliseconds, seconds, or minutes and activated, for example, with ST4 C Plane message by control plane (C-Plane) messaging.

According to an example embodiment, referring to the YANG Feature Name Tag HIBERNATE-SLEEP for the longer duration a hibernate-sleep mode may be activated by employing M-Plane, for example, by setting the parameter+--rw energy-saving-enabled? boolean {ENERGYSAVING}? in the respective o-ran-hardware.yang module to "True" or "Yes".

According to an example embodiment, referring to the YANG Feature Name Tags LIGHT-HIBERNATE-SLEEP and DEEP-HIBERNATE-SLEEP in order to differentiate the longer sleep with and without turning off synchronization plane circuit, light-hibernate-sleep mode with synchronization and deep-hibernate-sleep mode without synchronization may be implemented in a same way as that of hibernate-sleep by employing the M-Plane, for example, by setting the parameter+-rw energy-saving-enabled? boolean {ENERGYSAVING}? in the respective o-ran-hardware.yang module to "True" or "Yes".

Referring to the O-RU reporting to the O-DU and/or SMO based on yang modules such as, for example, as specified in the o-ran module.cap.yang, Advanced Sleep Modes (ASM) may support sleep modes having a short duration (C-Plane based) sleep modes (e.g., a plurality of sleep modes (SM) such as, for example, SM #0, SM #1, SM #2, SM #3, etc, wherein the time duration of SM #0<SM #1<SM #2<SM #3) with different wake-up times or if the wake-up times is too short a defined go-to-sleep time. Moreover, the Advanced Sleep Modes (ASM) may support sleep modes having a long duration (M-Plane based) sleep modes (e.g., the hibernate sleep that does not involve any synchronization or the hibernate sleep modes with or without synchronization, whereas the light hibernate sleep refers to a M-Plane based sleep mode with synchronization and the deep hibernate sleep refers to a M-Plane based sleep mode without synchronization.

According to an embodiment, the Advanced Sleep Modes (ASM) have a wake-up time (minimum or guaranteed) per sleep mode. The shortest of the C-Plane-based sleep modes (e.g., SM #0) may be not defined by a minimum or guaranteed wake-up time but by go-to-sleep time.

The O-RU reporting to the O-DU and/or SMO based on yang modules such as, for example, as specified in the o-ran module.cap.yang, may also support of C-Plane messages such as Section Type 8 (ST8) "ready" message and C-Plane messages including a command scope (e.g., CARRIER-COMMAND, ARRAY-COMMAND, O-RU-COMMAND) such as, for example, a Section Type 4 (ST4) message.

The O-RU reporting to the O-DU and/or SMO based on yang modules such as, for example, as specified in the o-ran module.cap.yang, may also support sleep duration extension and emergency wake-up by M-Plane and/or C Plane messaging.

Moreover, the O-RU reporting to the O-DU and/or SMO based on yang modules such as, for example, as specified in the o-ran module.cap.yang may also provide information such as the percentage of achievable energy savings.

Furthermore, the O-RU reporting to the O-DU and/or SMO yang modules such as, for example, as specified in the o-ran module.cap.yang, may also support a notification messaging for CU-Plane active or inactive state, such as, for example, support a notification that may be required to ensure the CU-Plane becomes active after sleep duration expires (i.e., a CU-Plane circuit may be turned off in the case of defined, undefined, and/or longer sleep duration). To this end, the O-RU reporting to the O-DU and/or SMO supports notifications from O-RU to O-DU about CU-Plane status in case it is turned off during any of the sleep mode activations.

To this end, in the O-RU, similar to existing M-Plane models (e.g., similar to energy-saving by transmission blanks parameter that the O-RU may send to the O-DU) a modified set of parameters may be defined to enable the O-RU report energy savings parameters e.g., energy-saving-by-rf-channel-reconfiguration, energy-saving-by-advanced-sleep-modes, energy-saving-by-modify-no-of-spatial-streams, etc. in order to report the supported energy saving modes (i.e., antenna array configuration capability information) and the hardcoded antenna array models along with the other initialization parameters to the O-DU.

Moreover, in an example embodiment, to ensure backward compatibility, the O-RU may mark an above-mentioned energy saving mode flag in the M-Plane yang models (e.g., an urn:o-ran:module-cap:1.0 and an urn:o-ran:hardware:1.0). to false, if O-RU does not support custom configurations or RF channel reconfigurations/antenna array selection approach for ES according to its hardcoded configuration vendor as set forth above.

According to an example embodiment, the TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, IPs, Cores, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having a long duration (M-Plane based) sleep modes the wake-up latency (i.e., the wake-up time or the go-to-sleep time) for said ASM and the wake-up latency of the TRx control methods may be different and not interfere with (e.g., hinder) each other.

In step 502, the O-RU receives a sleep mode type supported by the O-RU via a C-Plane Section Type 4 message or M-Plane command. The supported sleep mode type is based on the configuration capability information of the O-RU and a request to reconfigure the antenna array from a higher layer network function.

According to the example embodiments as set forth in step 502, sleep modes may be control plane (C-Plane) and/or management plane (M-Plane) compatible depending on the sleep duration.

According to example embodiments of the Advanced Sleep Modes (ASM) having short duration (C-Plane based) sleep modes and sleep modes having a long duration (M-Plane based) sleep modes the wake-up latency (i.e., the wake-up time or the go-to-sleep time) for said ASM and the wake-up latency of the TRx control methods (e.g., during a transition from one antenna array model to another antenna array model considering the transition time i.e., wake-up latency of the antenna configuration change) may be different and not interfere with (e.g., hinder) each other.

According to embodiments of the TRx control methods (e.g., the change an antenna array model on top of a baseline antenna array configuration of the O-RU based on the antenna array configuration comprising at least one antenna array model parameter supported by the O-RU), the antenna array configuration maybe activated via control plane (C-Plane) messaging and/or via management plane (M-Plane) messaging.

In step 503, the O-RU, based on the supported sleep mode type as determined by the O-DU, activates the sleep mode type to parts of the O-RU.

Alternatively, in a further step, according to an example embodiment, the O-RU sends a response to the antenna array configuration change (i.e., the antenna array model change) to the supported antenna array model via C-Plane messaging or M-Plane messaging to the O-DU.

In an example embodiment, the C-Plane messaging may be an acknowledgment message of the antenna array configuration change (i.e., the antenna array model change) to the supported antenna array configuration. In another example embodiment, the M-Plane messaging may be a notification of the antenna array configuration change to the supported antenna array configuration.

For example, the O-RU may notify a configuration change (i.e., the antenna array model change) during the transition from a one antenna array configuration (e.g., a first antenna array configuration) to another antenna array configuration (e.g., a second antenna array configuration) considering the transition time (i.e., wake-up time). The notification may be to the O-DU via the hierarchical architecture of the O-RAN or to the higher layer network functions (e.g., the SMO, RICs, etc.) via the hybrid architecture of the O-RAN.

According to an example embodiment, the O-RU may notify an antenna array configuration change (e.g., a back configuration to a baseline antenna array configuration) during the transition from the second antenna array configuration to the first antenna array configuration considering the transition time (i.e., wake-up time). For example, the O-RU notifies the rollback configuration change during the transition from an energy savings mode (i.e., the second antenna array configuration) to the baseline configuration (i.e., the first antenna array configuration) considering the transition time (i.e., wake-up time).

Figure 6:
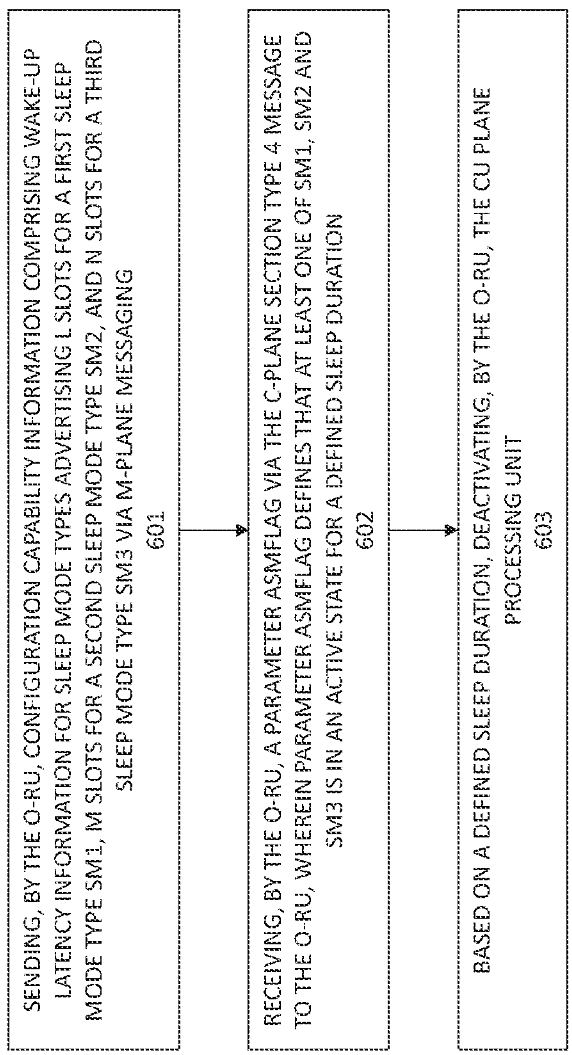
FIG. 6 illustrates a method using Wake-up Latency Information for sleep mode implementation by a parameter asmflag via the C-Plane Section Type 4 message according to an embodiment.

FIG. 6 illustrates a method using Wake-up Latency Information for sleep mode implementation by a parameter asmflag via the C-Plane Section Type 4 message. Referring to FIG. 6, in step 601, the O-RU sends the configuration capability information that further includes wake-up latency information for sleep mode types, wherein the wake-up latency information advertising L slots for a first sleep mode type SM1, M slots for a second sleep mode type SM2, and N slots for a third sleep mode type SM3 via M-Plane messaging.

In step 602, the O-RU receives a parameter asmflag via the C-Plane Section Type 4 message to the O-RU, wherein parameter asmflag defines that at least one of SM1, SM2 and SM3 is in an active state for a defined sleep duration.

In step 603, the O-RU deactivates the CU-Plane (i.e., deactivates the CU-Plane processing unit of the O-RU), based on a defined sleep duration.

To this end, in case a defined sleep duration is applied (i.e., promised) by O-DU, the O-RU may turn off the CU-Plane to achieve additional energy savings.

Alternatively, in step 603, the O-RU sends an ACK/NACK message via C-Plane Section Type 8 messaging, wherein the ACK message signals the O-DU to start scheduling CU-Plane data. The O-RU sends ACK/NACK messages via C-Plane Section Type 8 messaging based on a defined sleep duration and based on a predetermined sleep duration.

For example, the predefined sleep duration for an a SM1 may have a limit of up to 640 slots. Moreover, predefined sleep duration may be based on the sleep mode type and sub carrier spacing as set forth above (e.g., 11 to 640 slots for the sub carrier spacing of 960 kHz for SM1).

According to an example embodiment, for a long sleep duration, as an optional capability, M plane-based CU-Plane wake-up may be employed and C-Plane messaging may comprise ACK/NACK message (Section Type 8). The C-Plane ST 8 messaging may be used to ensure O-RU availability as the wake-up latency varies due to environmental conditions and O-RU design. Based on the received ACK message, O-DU may start scheduling CU-Plane data.

As a result, the ACK/NACK of the Section Type 8 message may be used to indicate if CU-Plane is active or not.

Figure 7:
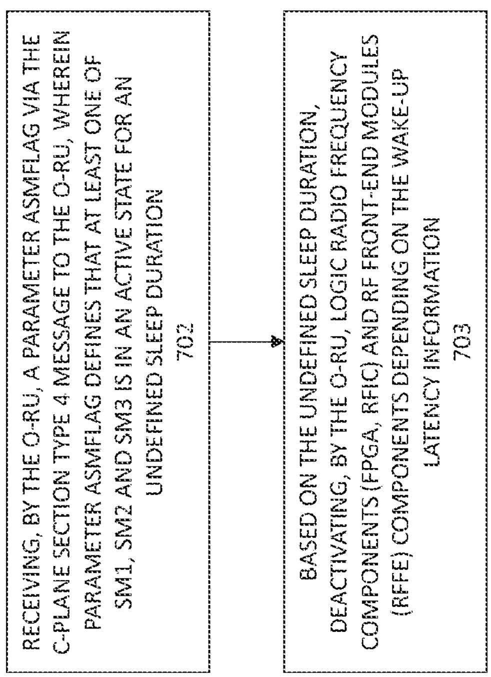
FIG. 7 illustrates a method for deactivating Logic Radio Frequency Components (FPGA, RFIC) and Rf Front-End Modules (RFFE) components depending on the Wake-Up Latency information according to an embodiment.

FIG. 7 illustrates a method for deactivating Logic Radio Frequency Components (FPGA, RFIC) and Rf Front-End Modules (RFFE) components depending on the Wake-Up Latency information.

Referring to FIG. 7, in step 701, the O-RU receives a parameter asmflag via the C-Plane Section Type 4 message to the O-RU, wherein parameter asmflag defines that at least one of SM1, SM2 and SM3 is in an active state for an undefined sleep duration.

In step 702, the O-RU deactivates the logic Radio Frequency components (FPGA, RFIC) and RF front-end modules (RFFE) components depending on the wake-up latency information. The deactivation of the parts of the O-RU is based on the undefined sleep duration. In case of an undefined sleep duration, the O-RU may either keep the CU-Plane active or turn it off. If CU-Plane is turned off, M-Plane-based wake-up be employed To this end, if there is no promise from O-DU on sleep duration (i.e., the O-DU does provide supported sleep mode type with defined sleep duration, the O-RU may keep the C Plane processing unit active, for example, the C-Plane processing unit remains "ON" during sleep to ensure KPIs. However, the O-RU may turn off all major power consumers such as FPGA, RFIC, RFFE components, etc. depending on the wake-up latency.

Figure 8:
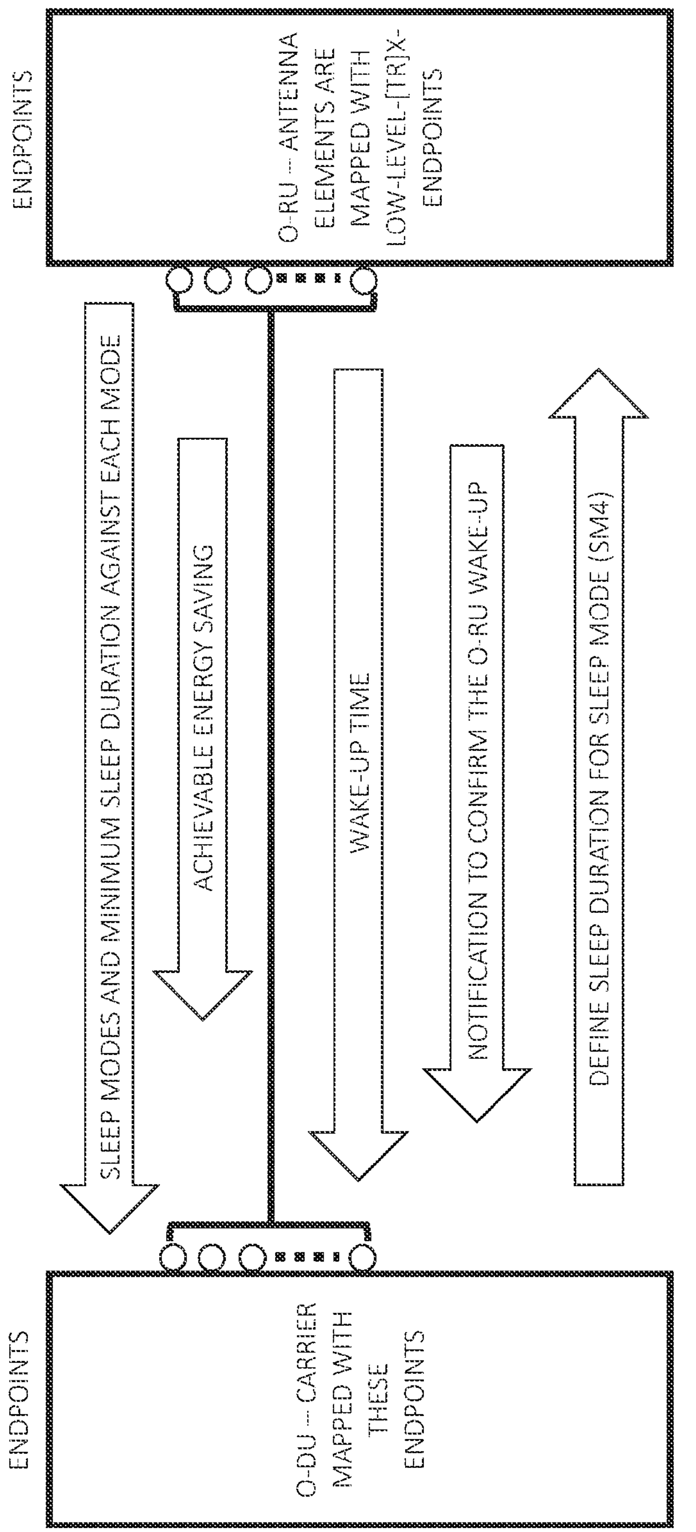
FIG. 8 illustrates a method of M-Plane messaging comprising a Yang model for capability reporting of sleep modes and associated parameters according to an embodiment.

FIG. 8 illustrates a method of M-Plane messaging comprising at least one Yang model for capability reporting of sleep modes (e.g., advanced sleep modes) and associated parameters according to an embodiment. Referring to FIG. 8, the O-RU reports its capability information to implement sleep modes based on the Yang model for capability reporting of sleep modes to O-DU. Based on the sleep mode the parameters and requirements of the O-RU may differ. The O-DU uses the capability information to apply a supported antenna array configuration (i.e., applying a supported antenna array configuration for the respective sleep mode).

Sleep Modes (SM) may be defined as summarized in the table below.

| Sleep Mode | Time Duration (Minimum Sleep Duration) | Minimum No of Slots O-RU-X | Minimum No of Slots O-RU-Y |
|---|---|---|---|
| Sleep Mode #0 (SM0) | Symbol to Slot | — | Not supported |
| Sleep Mode #1 (SM1) | L Slots (1 Slot) | 1 slot | 5 slots |
| Sleep Mode #2 (SM2) | M Slots (Radio Frame (10 ms)) | 10 slots | 15 slots |
| Sleep Mode #3 (SM3) | N Slots (100 ms) | 100 slots | 2000 slots |
| Sleep Mode #4 (SM4) | Undefined time (1 min) | 60000 slots | 70000 slots |

Referring to the above Table, 15 KHz SCS is considered for the number of slots calculation.

Regarding the sleep modes (e.g., the advanced sleep modes), advanced sleep modes with minimum sleep duration may be activated and deactivated and the minimum duration of against each sleep mode may be exchanged between the O-RU and the O-DU.

Regarding sleep modes, the achievable energy savings is either reported by O-RU or monitored by O-DU.

Moreover, for the sleep mode with undefined sleep (SM4), wake-up time is provided by the O-RU. Sleep mode #4 (SM4) (undefined time) is accomplished by setting "numSlots" and "sleepDepth" to zero and O-DU define the sleep time duration.

Furthermore, regarding the sleep mode with undefined sleep (SM4), a notification for confirming the wake-up may be sent by the O-RU.

The O-DU, based on the wake-up time as informed and/or confirmed by the O-RU, the O-DU defines the wake-up time for the sleep mode with undefined sleep (SM4).

In addition, for the sleep mode with undefined sleep (SM4), a notification for CU-Plane active or inactive state may be provided by the O-DU to ensure the CU-Plane is active after sleep duration expires.

of a command that the O-DU sets energy-saving enabled to "True" using "o-ran.hardware.yang" module, a command that the O-DU sends the <rpc> <edit-config> <[tr]x-array-carrier:: ACTIVE> with the value "SLEEP" or "INACTIVE" to O-RU to put to sleep or deactivate the carrier. Then O-RU change the [tr]x-array-carrier:: STATE to DISABLED through BUSY, a command that the O-DU uses appropriate RPCs (i.e., <edit-config> and <delete-config> to deconfigure or remove the carrier(s) in O-RU or that the O-RU may perform this operation by itself with its internal logic during the long sleep (e.g., this command may provision more energy saving as the associated circuits could be turned off), a command to turn off the C-Plane, U-Plane, S-Plane, and M-Plane circuits if all carriers are removed/de-configured during hibernate (long/deep) sleep, and command that the O-DU may turn off the C-Plane, U-Plane, S-Plane, and M-Plane circuits by sending appropriate commands/rpcs, a command that the O-RU itself with its internal logic may turn off the C-Plane, U-Plane, S-Plane, and M-Plane circuits, a command to turn off M-Plane (Netconf Supervision monitoring) and CU-Plane monitoring circuits (e.g., the turning off command for monitoring circuits may be applied on top of both TRx control and Advanced sleep mode-based energy saving use cases in case of long duration energy saving), a command that the O-RU sends a RPC reply to O-DU to indicate the correction reception of the above RPC by sending "ok".

In an example embodiment, a Yang model for capability reporting the CU-Plane circuit active state (awake from sleep) may have an o-ran-module-cap.yang structure that comprises the parameter according to the following summary.

The format for the module capabilities module is provided below

```
| +--ro energy-saving-by-transmission-blanks boolean
| +--ro energy-saving-by-trx-control boolean                //TRx control - various
antenna configuration for energy savings
| +--ro energy-saving-by-advanced-sleep-modes boolean
| | +--ro advanced-sleep-modes enum
| | +--ro micro-sleep-mode-supported? Boolean //O-DU read this response (either 'Yes' or 'No')
and get to know whether O-RU supports micro sleep or not - Option #1
| | +---n micro-sleep-mode-supported //Notification to indicate whether micro-sleep mode
supported or not - Option #2
| --- ro CU-plane-active-state enum //this capability to indicate CU-Plane circuit is awake and
active to receive messages from O-DU. For example, during sleep mode, CU-Plane circuit
turned
off sometime and wake-up. With the current notification framework, only carrier active state is
being reported by O-RU to O-DU. It is required to notify O-DU that CU-Plane is waked up
from
sleep and active before hand, so that O-DU can start scheduling CU-Plane packets.
| +--ro eaxcid-grouping-capabilities {o-ran-module-cap:EAXC-ID-GROUP-SUPPORTED}?
```

According to another example embodiment for the use case RF Channel Reconfiguration (i.e., RF Channel Switch Off/On) a sub-use case may be defined as Hibernate sleep. For this sub-use case, the O-RU receives an antenna array configuration supported by the O-RU from the O-Du via the management plane (M-Plane) messaging, wherein the supported antenna array configuration may include among other commands to activate and deactivate the O-RU at least one In an example embodiment, a Yang model for capability reporting the supported advanced sleep modes and associated parameter (e.g., advanced sleep modes) may have an o-ran-module-cap.yang structure that comprises the parameter according to the following summary. o-ran-uplane-conf.yang module The format for the userplane configuration module is provided below

```
| +--rw tx-array-carrier -> /user-plane-configuration/tx-array-carriers/name
//advanced sleep modes
+--ro advanced-sleep-modes-types
```

-continued

```
| +--ro sleep-mode#0: SM0 string
| | +--ro sleep-duration:tsleep decimal64/uint 16 // Sleep duration range (Tsleep)= symbol to
  Tslot, where Tslot is slot time in microseconds
| | | +--ro minimum-sleep-duration decimal/uint16 // symbol time
| | +--ro achievable-energy-saving decimal64 // achievable energy savings based on O-RU
  design, sleep mode, and environmental condition
| +--ro sleep-mode# 1: SM1 string
| | +--ro sleep-duration:tsleep decimal/uint16 // Sleep duration range (Tsleep)= Tslot to 10ms
| | | +--ro minimum-sleep-duration decimal/uint16          // Tslot - slot time in
  microseconds
| | +--ro achievable-energy-saving decimal64 // achievable energy savings based on O-RU
  design, sleep mode, and environmental condition
| +--ro sleep-mode#2: SM2 string
| | +--ro sleep-duration: tsleep decimal/uint16 // Sleep duration range (Tsleep)= 10ms to 100ms
| | | +--ro minimum-sleep-duration decimal/uint16 // 1 Radio frame (10ms)
| | +--ro achievable-energy-saving decimal64 // achievable energy savings based on O-RU
  design, sleep mode, and environmental condition
| +--ro sleep-mode#3: SM3 string
| | +--ro sleep-duration:tsleep decimal/uint16 // Sleep duration range (Tsleep)- 100 ms to 1 min
| | | +--ro minimum-sleep-duration decimal/uint16          // 100ms
| | +--ro achievable-energy-saving decimal64 // achievable energy savings based on O-RU
  design, sleep mode, and environmental condition
| +--ro sleep-mode#4: SM4 string
| | +--ro sleep-duration: tsleep decimal/uint16 // Sleep duration range (Tsleep)= undefined time
  (to be defined by O-DU)
| | | +--ro minimum-sleep-duration decimal/uint16          // 1 minute
| | +--ro wake-up-timedecimal64 //wakeup time range based on O-RU design, sleep mode
  duration, and environmental condition
| | +--ro achievable-energy-saving decimal64 // achievable energy savings based on O-RU
  design, sleep mode, and environmental condition
| +--rw low-level-tx-endpoint -> /user-plane-configuration/low-level-tx-endpoints/name
```

According to embodiments of the Advanced Sleep Modes (ASM) having short duration (C-Plane based) sleep modes and sleep modes having long duration (M-Plane based) sleep modes the wake-up latency (i.e., the wake-up time or the go-to-sleep time) for said ASM and the wake-up latency of the TRx control methods may be different and not interfere with (e.g., hinder) each other.

Moreover, regarding common capability parameters to be reported by O-RU configuration capability information to the O-DU via M-Plane for both TRx control methods and sleep modes (e.g., advanced sleep modes) may include C-Plane ST8 "ready" messages and sleep duration extension (e.g., in case of defined sleep, if the O-DU needs to extend a sleep mode it send a sleep extension command just before the start of wake-up time). In case the CU-Plane remains active, the extension command may be C-Plane-based for short sleep durations. In case the CU-Plane is turned off the extension command may be M-Plane based for long sleep durations.

Furthermore, regarding common capability parameters to be reported by O-RU configuration capability information to the O-DU via M-Plane for both TRx control methods and sleep modes (e.g., advanced sleep modes) may include an emergency wake-up of O-RU from sleep. This capability may be reported by O-RU via M-Plane. For example, in case of sleep mode interruption, if the O-DU needs to interrupt a sleep mode it sends a sleep mode interruption command. In case the CU-Plane remains active, the emergency wake-up command may be C-Plane-based for short sleep durations (defined or undefined). In case the CU-Plane is turned off the emergency wake-up command may be M-Plane-based for long sleep durations (defined or undefined).

According to an example embodiment, when a sleep mode is activated for a predefined duration, the CU-Plane processing unit can be shut down. The CU-Plane processing unit then wakes up after the sleep duration has ended.

The CU-Plane processing unit may be turned off if the sleep duration is significantly longer than the wake-up duration of the CU-Plane processing unit.

Moreover, when the O-RU is in sleep mode for a pre-defined duration, the CU-Plane processing unit is turned off and if the O-DU needs to interrupt the sleep, it can send the M-Plane wake-up command (i.e., the emergency wake-up command) to the O-RU to wake up the CU-Plane processing unit.

In response to the above Wake-up command, the O-RU can send the notification to O-DU to indicate the CU-Plane processing unit wake-up is complete.

According to an example embodiment, the o-ran-module-cap.yang among other YANG models for CU-Plane status reporting (e.g., to implement O-RU capabilities for defined and undefined sleep modes). The o-ran-module-cap.yang comprises information to enable a CU-Plane circuit to be turned off to attain additional energy saving. The information may include a name identifier and a status identifier of the rx-array-carriers as well as a name identifier, action identifier and state for the CU-Plane in order to report the user plane configuration. Based on the above information, the O-DU may turn on or wake up the CU-Plane circuit through the M-Plane. According to an example embodiment, a notification is needed to indicate if CU-Plane becomes active or not (wake-up from sleep), the same may be defined in the o-ran-uplane.yang, respectively.

In an example embodiment, a Yang model to indicate the CU-Plane is active from sleep may have an o-ran-uplane-conf.yang structure that comprises the parameter according to the following summary.

The format for the user plane configuration module is provided below

```
+---n rx-array-carriers-state-change
+--ro rx-array-carriers*[name]
+--ro  name→/user-plane-configuration/rx-array-carriers/
   name
+--ro  state?→/user-plane-configuration/rx-array-carriers/
   state
+---n cu-plane-state-change
```

|+--ro cu-plane [name]

|+-ro state?→/user-plane-configuration cu-plane state;

The state can be active, sleep, and inactive disabled

Figure 9:
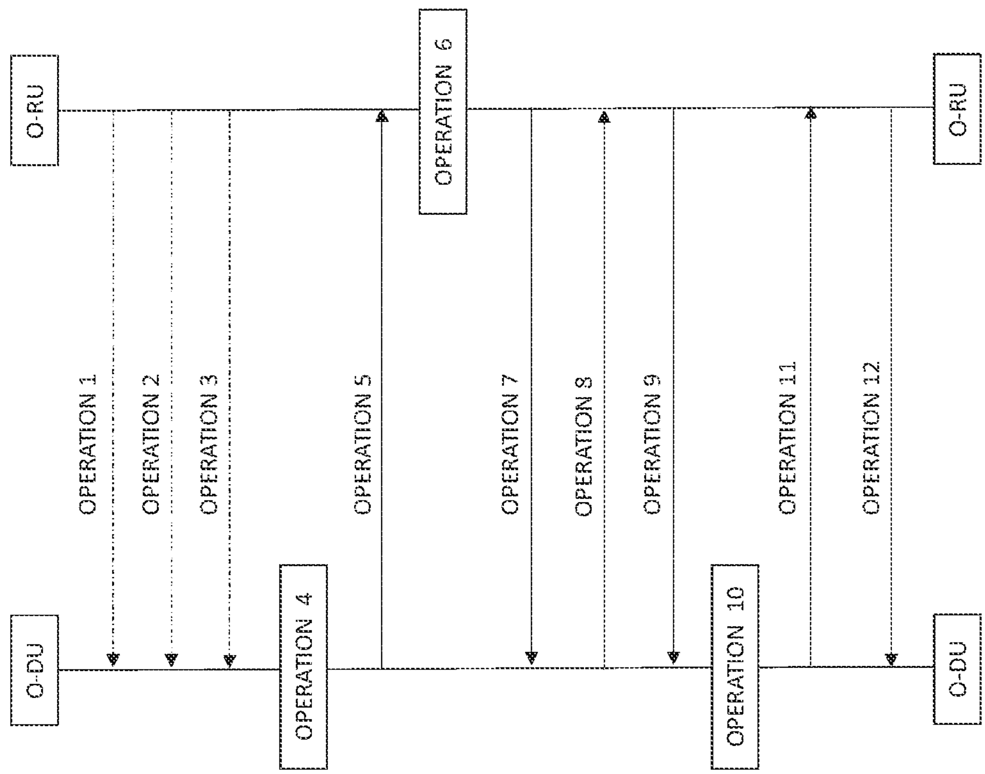
FIG. 9 illustrates a flowchart for M-Plane/C-Plane messaging between an O-RU and an O-DU for the use case of sleep modes according to an embodiment.

FIG. 9 illustrates a flowchart for M-Plane/C-Plane messaging between an O-RU and an O-DU for the use case of sleep modes. Referring to FIG. 9, in operation 1, the O-RU provides the O-DU with a list of supported sleep modes (e.g., Advanced Sleep Modes) along with minimum sleep duration thereof (i.e., configuration capability information reported by the O-RU to the O-RU via M-Plane messaging may comprise a list of supported sleep modes (e.g., Advanced Sleep Modes) along with minimum sleep duration.

In operation 2, the O-RU provides the O-DU with the achievable energy savings for each sleep mode (e.g., each sleep mode provided in operation 1 may refer to an array configuration).

In operation 3, for the case of a sleep mode with undefined sleep (i.e., for SM4), the O-RU provides the O-DU with a wake-up time from a sleep state to an active state for the undefined sleep (i.e., for the sleep mode SM4).

In general, operations 1 to 3 as set forth above refer to the O-RU capability reporting to the O-DU (i.e., to the receiving of configuration capability information of the O-RU by the O-DU).

In operation 4, the O-DU maps the reported Sleep Modes. The Sleep modes are defined by (i.e., mapped to) the C-Plane parameter "sleepMode". Moreover, the O-DU maps the reported sleep duration and sleep mode (i.e., except indefinite/undefined sleep mode) to C-Plane parameters "sleepDur" and "Mul", respectively. The parameter "Mul" is employed to have flexibility in sleep duration within the range of a particular sleep mode supported by O-RU. The C-Plane parameter "sleepMode", "sleepDur" and "Mul" may be defined in fields in a ST4 CMD TYPE message referring to Advanced Sleep Modes.

In operation 5, the O-DU sends an ST4 message ("sleepMode" and "Tsleep") to O-RU and activates the sleep with a specific time duration (based on the adopted sleep mode). The dispatch of the ST4 message ("sleepMode" and "Tsleep") is based on a higher-layer network function request or the O-DU itself decides to activate sleep mode.

In operation 6, the O-RU receives the sleep command through ST4 message with the definite duration and processes it. In an example embodiment, for a sleep mode with an indefinite sleep, the O-DU may send a sleep mode activation request to O-RU through the ST4 (C Plane) message or via M-Plane messaging (i.e., carrier deactivation).

In operation 7, the O-RU provides the O-DU with O-RU sends a notification to confirm the successful/failure of sleep mode activation to the O-DU.

In operation 8, in case a failure occurred during sleep mode activation, the O-DU either retry sleep mode activation or take appropriate action (e.g., reports to higher-layer network functions, commence a fail-safe procedure, etc.). In an example embodiment, according to the action of O-DU in case of a failure, the O-RU may respond to the actions requested by O-DU in operation 8.

In operation 9, the O-RU provides the O-DU with O-RU reports the power consumption using the performance counter "epe-stats" via M-Plane based on the O-DU subscribing to O-RU for this "epe-stats" counter.

In operation 10, O-DU monitors the power consumption during each sleep mode/sleep duration. Moreover, the O-DU either forwards the power consumption data to higher layers or calculates the energy savings per sleep mode for future reference.

In operation 11, O-DU sends a wake-up command to O-RU to deactivate the sleep mode.

In operation 12, the O-RU sends a notification to confirm the successful deactivation of sleep mode and becomes active. In general, this notification refers to a notification for reporting the change of an array configuration change from a first array configuration to a second array configuration or vice-versa.

Figure 10:
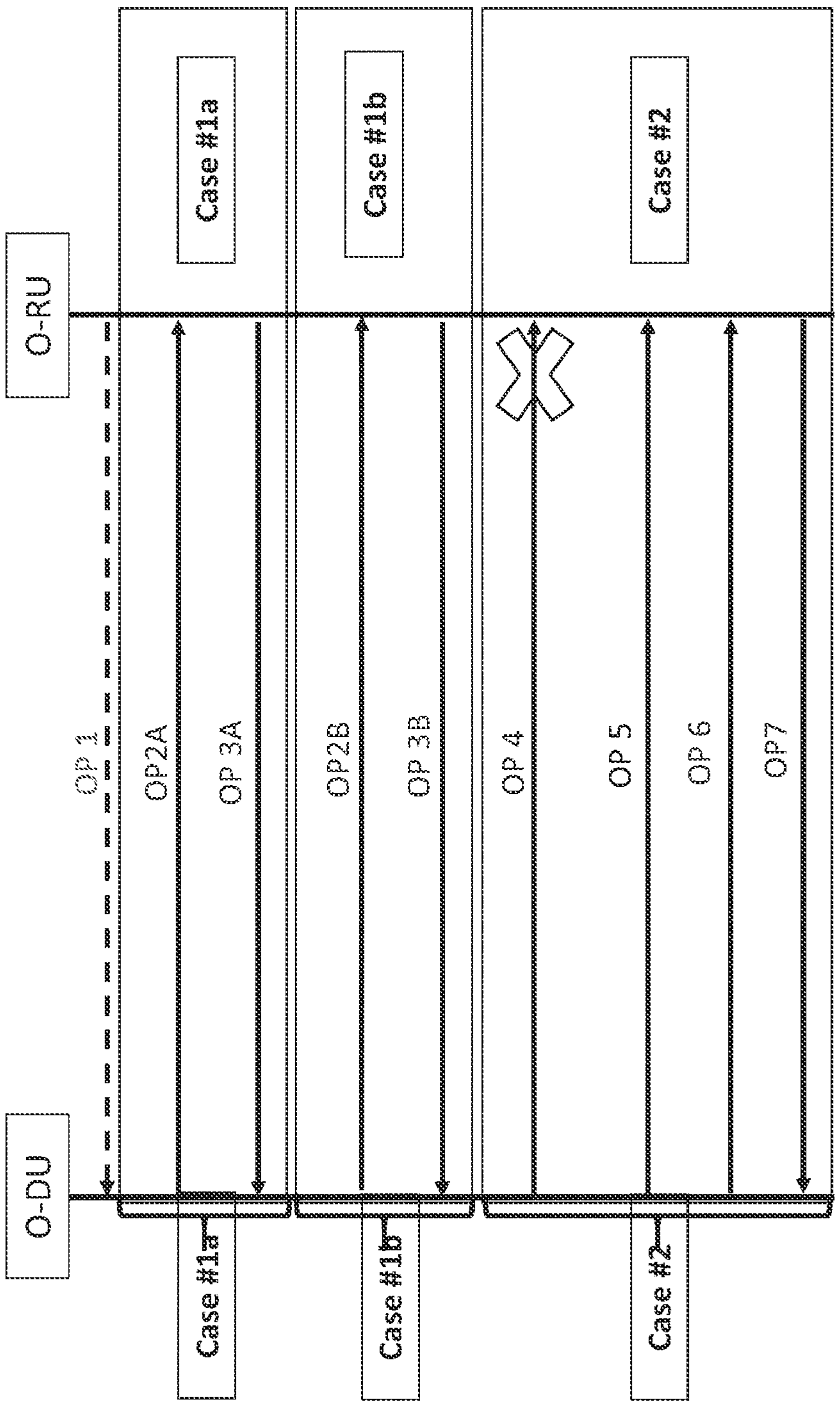
FIG. 10 illustrates a flowchart for sleep mode implementation of a sleep mode type SM1 according to example embodiments.

FIG. 10 illustrates a flowchart for sleep mode implementation of a sleep mode type SM1. Referring to FIG. 10, in operation 1, the O-RU sends wake-up latency information as a part of the configuration capability information to the O-DU. For example, the O-RU capability reporting to O-DU via the M plane comprises a minimum sleep duration/wake-up latency of advertising L slots for a first sleep mode type SM1, M slots for a second sleep mode type SM2, and N slots for a third sleep mode type SM3. Alternatively, the configuration capability information includes U slots for an undefined sleep duration for an undefined sleep mode type.

According to an embodiment, the configuration capability information may include 14 different sleep duration values configured by M-Plane for a sleep beyond 255 slots.

In operation 2A, according to example embodiment case #1*a*, the O-DU sends a first sleep mode type (SM1) activation request via a C-Plane Section Type 4 message to the O-RU. According to an embodiment, a one radio frame refers to 15 KHz and is about 10 slots long. In this case the O-RU sleeps for 30 slots (10 slots (sleep duration)+20 slots (wake-up latency)). In operation 3A, The O-RU wakes up after a defined sleep duration of 30 slots.

In operation 2B, according to an example embodiment case #1*b*, the O-DU sends a first sleep mode type (SM1) activation request via a C-Plane Section Type 4 message (ST4 msg) to the O-RU. According to an embodiment, a one radio frame refers to a radio frame refers to 120 KHz and is about 80 slots long. In this case the O-RU sleeps for 100 slots (80 slots (sleep duration)+20 slots (wake-up latency)). In operation 3B, the O-RU wakes up after a defined sleep duration of 100 slots.

According to example embodiments case #1*a* and case #1*b*, the O-DU schedule a sleep for maximum of 255 slots (SM1>L slots). According to the examples case #1*a* and case #1*b*, L equals 20 slots (i.e., the minimum sleep duration for SM1), wherein the Subcarrier Spacing (SCS) is defined to 15 KHz and 120 KHz. Thus, the sleep durations for a radio frame case #1*a* is 10 slots for 15 KHz SCS and a radio frame in case #1*a* 80 slots for 120 KHz SCS.

In operation 4, according to example embodiment case #2, the O-DU may send a Sleep Mode (SM1) activation request via a C-Plane ST4 msg. According to an embodiment, the sleep duration may refer to four radio frames, wherein one radio frame refers to 120 KHz and is about 320 slots long. In this case the O-RU, however, sleeps for 340 slots (320 slots (sleep duration)+20 slots (wake-up latency)). For the above setting, the O-RU therefore would wake up late because L=20 slots (Minimum Sleep duration for SM1) must be taken into according.

To this end, in operation 5, an alternative to example embodiment case #2, the O-DU, for example, checks 14 sleep values and may not find an exact sleep duration to match the above example (i.e., 4 radio frames @120 KHz SCS, 320 slots) hence, the O-DU, determined the closest sleep duration value supported by the O-RU, for example, 430 slots.

As result, in operation 5, the O-DU sends a Sleep Mode (SM1) activation request via a C-Plane ST4 msg for 430 slots, wherein the 430 slots were part of the M-plane configured sleep values sent together with configuration capability information, for example, in operation 1.

In operation 6, in order to match to the 340 slots (320 slots (sleep duration)+20 slots (wake-up latency) for the example embodiment case #2 as set forth above, the O-DU sends an interrupt via a C-Plane Section Type 4 message to wake up the O-RU from the first sleep mode type SM1 after 320 slots (sleep duration). For example, the O-RU after 320 slots (sleep duration) starts activating and the CU-Plane is active after L slots (i.e., the 20 slots (wake-up latency)).

Accordingly, in operation 7, the O-RU wakes up and is active after a sleep duration of 340 slots (i.e., 320 slots (sleep duration)+20 slots (wake-up latency)).

According to operation 5 and 6, O-DU schedules sleep for any of the 14 different sleep duration values advertised by O-RU via M plane, wherein the O-RU may keep to CU-Plane (i.e., C-Plane) active or turns it off.

Figure 11:
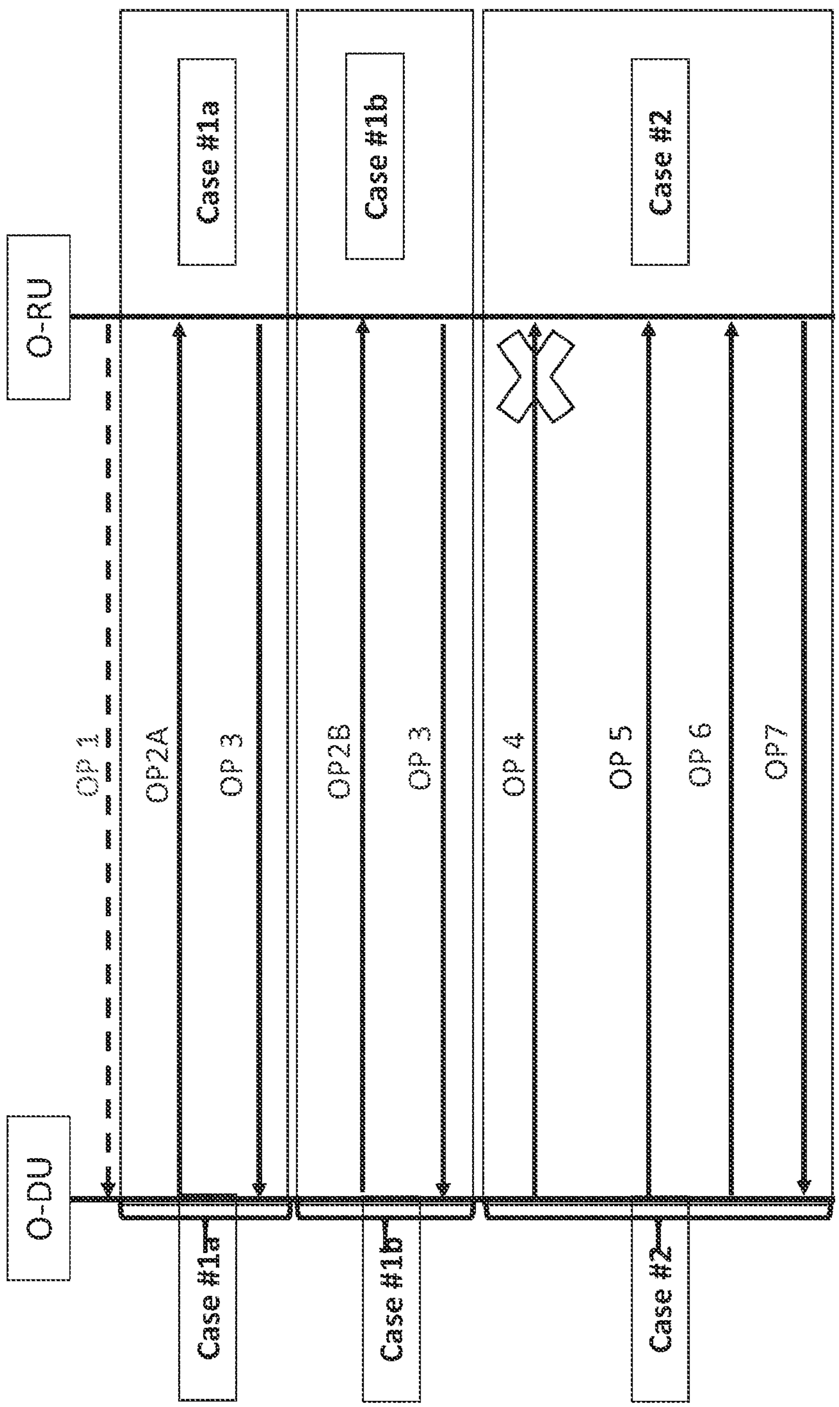
FIG. 11 illustrates a flowchart for sleep mode implementation of a sleep mode type SM3 according to example embodiments.

FIG. 11 illustrates a flowchart for sleep mode implementation of a sleep mode type SM3. Referring to FIG. 11, in operation 1, the O-RU sends wake-up latency information as a part of the configuration capability information to the O-DU. For example, the O-RU capability reporting to O-DU via the M plane comprises a minimum sleep duration/wake-up latency of advertising L slots for a first sleep mode type SM1, M slots for a second sleep mode type SM2, and N slots for a third sleep mode type SM3. Alternatively, the configuration capability information includes U slots for an undefined sleep duration for an undefined sleep mode type.

According to an embodiment, the configuration capability information may include 14 different sleep duration values configured by M-Plane for a sleep beyond 255 slots.

In operation 2A, according to example embodiment case #1*a*, the O-DU sends a third sleep mode type (SM3) activation request via a C-Plane Section Type 4 message to the O-RU. According to an embodiment, a one radio frame refers to 15 KHz and is about 10 slots long. In this case, the O-RU sleeps for 110 slots (10 slots (sleep duration)+100 slots (wake-up latency)). In operation 3A, The O-RU wakes up after a defined sleep duration of 110 slots.

In operation 2B, according to an example embodiment case #1*b*, the O-DU sends a third sleep mode type (SM3) activation request via a C-Plane Section Type 4 message (ST4 msg) to the O-RU. According to an embodiment, a one radio frame refers to a radio frame refers to 120 KHz and is about 80 slots long. In this case the O-RU sleeps for 180 slots (80 slots (sleep duration)+100 slots (wake-up latency)). In operation 3B, the O-RU wakes up after a defined sleep duration of 180 slots.

According to example embodiments case #l*a* and case #1*b*, the O-DU schedules a sleep for a maximum of 255 slots (SM3>N slots). According to the examples case #1*a* and case #1*b*, N equals 100 slots (i.e., the minimum sleep duration for SM3), wherein the Subcarrier Spacing (SCS) is defined as 15 KHz and 120 KHz. Thus, the sleep durations for a radio frame case #1*a* is 10 slots for 15 KHz SCS and a radio frame in case #1*a* 80 slots for 120 KHz SCS.

In operation 4, according to example embodiment case #2, the O-DU may send a Sleep Mode (SM1) activation request via a C-Plane ST4 msg. According to an embodiment, the sleep duration may refer to four radio frames, wherein one radio frame refers to 120 KHz and is about 320 slots long. In this case, the O-RU, however, sleeps for 420 slots (320 slots (sleep duration)+100 slots (wake-up latency)). For the above setting, the O-RU therefore would wake up late because N=100 slots (Minimum Sleep duration for SM3) must be taken into according.

To this end, in operation 5, an alternative to example embodiment case #2, the O-DU, for example, checks 14 sleep values and may not find an exact sleep duration to match the above example (i.e., 4 radio frames @120 KHz SCS, 320 slots) hence, the O-DU, determined the closest sleep duration value supported by the O-RU, for example, 430 slots.

As result, in operation 5, the O-DU sends a Sleep Mode (SM1) activation request via a C-Plane ST4 msg for 430 slots, wherein the 430 slots were part of the M-plane configured sleep values sent together with configuration capability information, for example, in operation 1.

In operation 6, in order to match to the 420 slots (320 slots (sleep duration)+100 slots (wake-up latency) for the example embodiment case #2 as set forth above, the O-DU sends an interrupt via a C-Plane Section Type 4 message to wake up the O-RU from the first sleep mode type SM1 after 320 slots (sleep duration). For example, the O-RU after 320 slots (sleep duration) starts activating and the CU-Plane is active after N slots (i.e., the 100 slots (wake-up latency)).

Accordingly, in operation 7, the O-RU wakes up and is active after a sleep duration of 420 slots (i.e., 320 slots (sleep duration)+100 slots (wake-up latency)).

According to operation 5 and 6, O-DU schedules sleep for any of the 14 different sleep duration values advertised by O-RU via M plane, wherein the O-RU may keep to CU-Plane (i.e., C-Plane) active or turns it off.

FIG. 12 illustrates a sleep mode implementation according to a Section Type 4 command type (ST4CmdType) TRX CONTROL. Referring to FIG. 12, sleep modes have different sleep depths.

Referring to FIG. 12, TRX CONTROL command type is in line with the Section Type 4 command type (ST4CmdType), wherein the Command Common Header Format comprises 8-bit fields (i.e., octet fields). The Command Common Header Format comprises various headers, each header comprising one or more header fields (i.e., header octets).

According to the TRX CONTROL command type configuration, a first header field is occupied by a transport header. The transport header refers to an 8-byte sequence of a first Octet (i.e., # of bytes is 8 from Octet 1 to Octet 8).

A second header field is occupied by a common Section Type 4 header. The common Section Type 4 header refers to an 8-byte sequence of a 9th Octet (i.e., # of bytes is 8 from Octet 9 to Octet 16).

A third header field is occupied by a Section Type 4 common part of the command header. The Section Type 4 common part of the command header refers to an 8-byte sequence of a 17th Octet (i.e., # of bytes is 8 from Octet 17 to Octet 24).

A fourth header field is occupied by a multiple command Section Type 4 header that refers to a one-byte sequence of a 25th Octet (i.e., # of bytes is 1 of an Octet 25).

The multiple command Section Type 4 header comprises a direction identifier bothDir at the most significant msb 0-bit position, a turnoff field at a 1-bit position. Moreover, the 2-bit position to the 5-bit position of the multiple command Section Type 4 header refers to an identifier of the sleep mode types sleepDurIndex field (i.e., [sleepDurIndex3:0]). The 6-bit position and the least significant bit, the 7-bit position, refer to the sleep depth of advanced sleep modes (i.e., sleepDepth [1:0]) of a 25th Octet (i.e., # of bytes is 1 of an Octet 25).

A fifth header field may comprise of a reserved field and a one-byte sequence of a 26th Octet (i.e., # of bytes is 1 of an Octet 26).

The one-byte sequence of a 26th Octet in the fifth header field may be occupied by a log 2maskbits header (i.e., log 2maskbits [3:0]). The log 2maskbits header command header refers to a one-byte sequence of a 26th Octet (i.e., # of bytes is 1 of an Octet 26).

A sixth header field is occupied by the Antenna Layer Mask antLayerMask command header (i.e., antLayerMask [15:0]*-reserved when cmdScope≠ARRAY-COMMAND). The antLayerMask header refers to a 2-byte (16-bit) sequence of a 27th Octet (i.e., # of bytes is 1 of Octet 27).

A seventh header field is occupied by the Antenna Mask antMask command header (i.e., antMask[x:0]—only present when cmdScope=ARRAY-COMMAND). The antMask header refers to an 8-byte (64-bit) sequence of a 29th Octet (i.e., # of bytes are variable (e.g., a 2-byte field from Octet 28 to Octet 29).

According to an example embodiment, the TRx control process to reconfigure the antenna array may include TRx control configurations that are identified by a respective unique configuration identity or name. The antenna array model of said TRx control configuration includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the TRx control process may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control process may include control to turn on/off Components, Circuits, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having long duration (M-Plane based) sleep modes the wake-up latency (i.e., the wake-up time or the go-to-sleep time) for said ASM and the wake-up latency of the TRx control may be different and not interfere with (e.g., hinder) each other.

FIG. 13 illustrates a sleep mode implementation according to a Section Type 4 command type (ST4CmdType) st4CmdType 'TRX-CONTROL ADVANCED-SLEEP-MODE'.

Referring to FIG. 13, the st4CmdType 'TRX-CONTROL ADVANCED-SLEEP-MODE' according to the TRX CONTROL command type configuration, a first header field is occupied by a transport header. The transport header refers to an 8-byte sequence of a first Octet (i.e., # of bytes is 8 from Octet 1 to Octet 8).

A second header field is occupied by a common Section Type 4 header. The common Section Type 4 header refers to an 8-byte sequence of a 9th Octet (i.e., # of bytes is 8 of from Octet 9 to Octet 16).

A third header field is occupied by a Section Type 4 common part of the command header. The Section Type 4 common part of the command header refers to an 8-byte sequence of a 17th Octet (i.e., # of bytes is 8 from Octet 17 to Octet 25).

A fourth header field is occupied by a multiple command Section Type 4 header that refers to a 3-byte sequence of a 25th Octet (i.e., # of bytes is 3 from Octet 25 to Octet 27).

The multiple command Section Type 4 header comprises a direction identifier bothDir at the most significant msb 0-bit position, followed by an OnOff field, a one-bit symbolMask[0:1] field, a one-bit advances sleep mode flag asmflag[0:1], a 16-bit eAxCmask[0:15] field and a one-byte sleepDepth[1:0] of a 25th Octet (i.e., # of bytes is 3 from Octet 25 to Octet 27).

A fifth header field is occupied by a multiple command Section Type 4 header that refers to a 4-byte sequence of a 28th Octet (i.e., # of bytes is 4 from Octet 28 to Octet 31).

The multiple command Section Type 4 header comprises an extnumSlots [0:15] field, a symbolMask[0:11] field and a log 2maskbits[3:0] field of a 28th Octet (i.e., # of bytes is 3 from Octet 28 to Octet 31).

The parameter "extnumSlots" may be used to select any defined sleep duration along with "numSlots" in common header, which offers complete flexibility and hence "sleepDurIndex" according to C-Plane st4CmdType 'TRX-CONTROL' in FIG. 12 may not be required.

According to an example embodiment the total sleep duration in slots may be the sum of the values (number of slots) of parameters extnumSlots, numSlots and the wake-up latency, wherein the latter is reported via M plane messaging (i.e., provided by configuration capability information via M-Plane messaging) for each sleep mode. Moreover, for the defined sleep duration, CU-Plane may be turned off for additional energy savings.

According to an example embodiment for sleep mode SM1, with a sleep duration of 4 radio frames (i.e., 40 ms), the wake-up latency for SM1 refers to L equal to 20 slots. Thus, for a sub-carrier spacing (SCS) is equal to 15 KHz the total sleep duration is equal to 60 slots (40 slots+20 slots (wake-up latency)). Thus, for a sleep duration in slots (@15 KHz SCS) equal to 60 slots the total sleep duration in slots is calculated as follows: extnumSlots (0)+numSlots (40)+L (20 slots).

According to another example embodiment for sleep mode SM1, for a SCS equal to 120 KHz the total sleep duration is 340 slots (320 slots+20 slots (wake-up latency)). Thus, for a sleep duration in slots (@120 KHz SCS) equal to 340 slots the total sleep duration in slots is calculated as follows: extnumSlots (65)+numSlots (255)+L (20 slots).

According to an example embodiment for sleep mode SM3, with a sleep duration of 4 radio frames (i.e., 40 ms), the wake-up latency for SM 3 refers to N equal to 100 slots. Thus, for a sub-carrier spacing (SCS) is equal to 15 KHz the total sleep duration is equal to 140 slots (40 slots+100 slots (wake-up latency)). Thus, for a sleep duration in slots (@15 KHz SCS) equal to 140 slots the total sleep duration in slots is calculated as follows: extnumSlots (0)+num Slots (40)+L (100 slots).

According to another example embodiment for sleep mode SM3, for a SCS equal to 120 KHz the total sleep duration is 420 slots (320 slots+100 slots (wake-up latency)). Thus, for a sleep duration in slots (@120 KHz SCS) equal to 420 slots, the total sleep duration in slots is calculated as follows: extnumSlots (65)+numSlots (255)+L (100 slots).

A sixth header field is occupied by the Antenna Layer Mask antLayerMask command header (i.e., antLayerMask [15:0]*-reserved when cmdScope≠ARRAY-COMMAND). The antLayerMask header refers to a 2-byte (16-bit) sequence of a 27th Octet (i.e., # of bytes is 2 from Octet 32 to Octet 34).

A seventh header field is occupied by the Antenna Mask antMask command header (i.e., antMask[x:0]—only present when cmdScope=ARRAY-COMMAND). The antMask header refers to an 8-byte (64-bit) sequence of a 29th Octet (i.e., # of bytes are variable from Octet 32 onwards).

According to the st4CmdType 'TRX-CONTROL ADVANCED-SLEEP-MODE' in FIG. 13, the use of TRX-CONTROL command (undefined sleep duration) may include an operation wherein the O-DU reads the O-RU sleep capabilities including L, M, and N values for the supported sleep levels. To this end, when the O-DU determines to deactivate antenna elements/layers, the O-DU may issues TRX-CONTROL commands. The first TRX-CONTROL command comprises field values numSlots=0, sleepDurIndex=0xF, sleepDepth=0. Though there is no guaranteed sleep duration, antenna elements may be activated in any future slot with no minimum sleep duration. The second TRX-CONTROL command comprises field values numSlots=0, sleepDurIndex=0xF, sleepDepth≠0. In this case the O-RU may enter the commanded sleep mode and the O-DU may not activate antenna elements/layers (as specified by the new masks) earlier than L or M or N slots later. To this end, when a new (i.e., a change in) TRX-CONTROL command is received by the O-RU it may activate the new mask exactly L or M or N slots after receiving the command. This rule holds even if the new mask uses fewer antenna elements than the previous mask.

To this end, L, M, and N slots are defined as wake-up latency (i.e., transition time) only for the sleep modes 1, 2, and 3, respectively. However, for undefined sleep, wake-up latency may not be defined.

Referring to FIG. 13, if TRx control and advanced sleep modes simultaneously carried out, there is need to consider the transition latency wake-up latency (i.e., transition time) that occurs while changing from one TRx control configuration to another TRx control configuration (i.e., an antenna configuration change during a transition from one antenna array model to another antenna array model).

The wake-up latency (i.e., transition time) definitions may be used for applying the sleep modes on top of TRx control, otherwise, L, M, and N need to be explicitly defined with two values corresponding to TRx control and Sleep mode.

Moreover, the Sleep mode definitions may be used to execute the TRx control for both defined and undefined durations.

Furthermore, in advanced sleep mode, some of the components are turned off depending on the sleep duration, however, in TRx control entire baseband and RF processing chains pertain to some of the antenna elements are turned off. Hence, wake-up latency (ASM) and transition time (TRx control) may be different.

FIG. 14 illustrates a sleep mode implementation according to a Section Type 4 command type (ST4CmdType) st4CmdType 'TRX-CONTROL/ADVANCED-SLEEP-MODE' comprising a parameter symbolMask for implementing a symbol level sleep duration to support sleep mode type 0 (SM0).

Referring to FIG. 14, the st4CmdType 'TRX-CONTROL/ADVANCED-SLEEP-MODE' is similar to FIG. 13. A fifth header field is occupied by a multiple command Section Type 4 header that refers to a 4-byte sequence of a 28th Octet (i.e., # of bytes is 4 from Octet 28 to Octet 31). The multiple command Section Type 4 header comprises an extnumSlots [0:15] field, a symbolMask[0:11] field and a log 2maskbits [3:0] field of a 28th Octet (i.e., # of bytes is 3 from Octet 28 to Octet 31).

The parameter "symbolMask" may be used to define the sleep duration from few symbols to one or few slots in case of sleep mode type 0 (SM0). Bit '1' corresponds to symbol for which SM0 needs to be activated and Bit '0' corresponds to the symbol not to be used for SM0 as shown in FIG. 14.

If the values of parameter symbolMask indicate allocations beyond a slot boundary, such allocations may be ignored (e.g., when there are fewer than 14 symbols in a slot).

Figure 15:
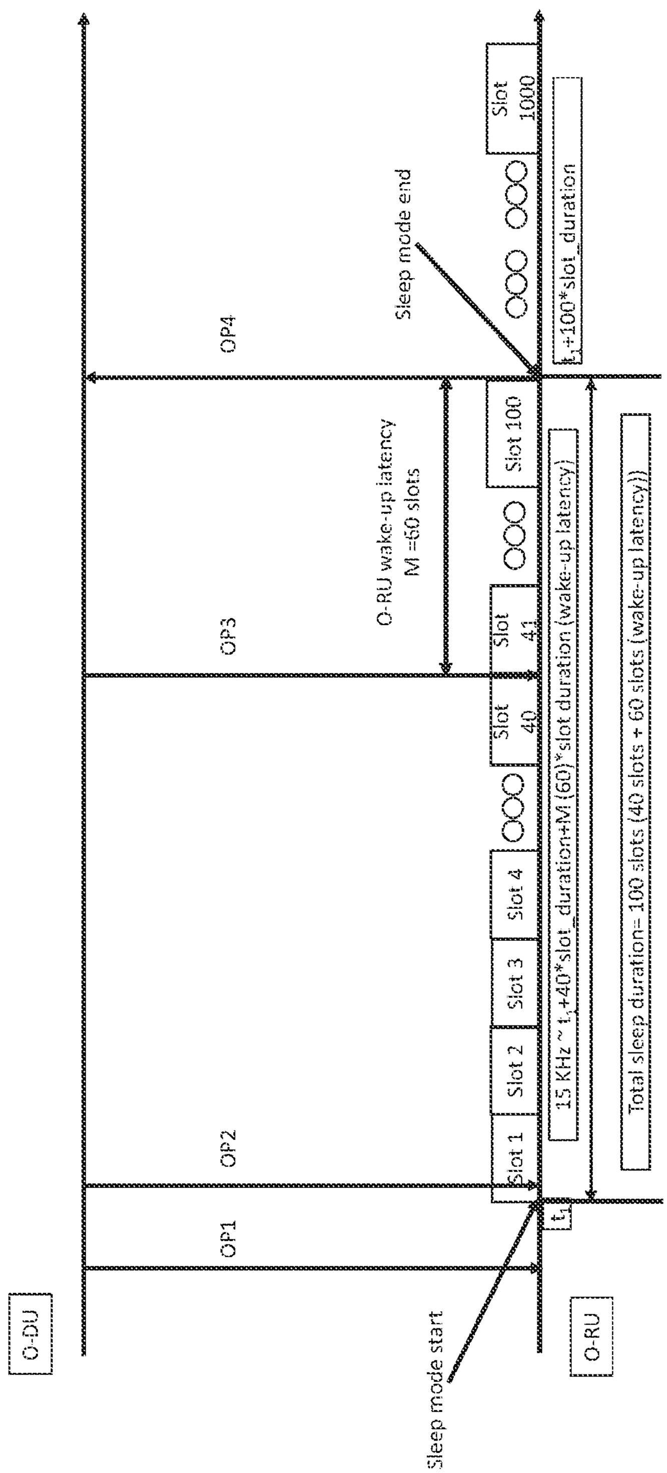
FIG. 15 illustrates a flowchart for the start and wake-up process between the O-DU and the O-RU for sleep mode implementation by Control-Plane Section Type 4 Messaging according to an example embodiment.

FIG. 15 illustrates a flowchart for the start and wake-up process between the O-DU and the O-RU for sleep mode implementation by Control-Plane Section Type 4 Messaging. Referring to FIG. 15, the parameters as shown in FIGS. 13 and 14 are applied to implement the sleep modes. FIG. 15 shows the implementation of second sleep mode type SM2, (i.e., an advanced sleep mode) by ST4 message. According to the example embodiment, the SCS is 15 KHz for SM2. The O-RU advertised the minimum sleep duration/wake-up latency (i.e., SM2-M slots) via M-Plane messaging of the configuration capability information (wake-up latency information) to the O-DU. Regarding the sleep mode implementation in FIG. 15, the SM2 refers to a defined sleep, i.e., the O-RU schedule a sleep for any number of slots (SM2>M slots), wherein the C-Plane remains active (i.e., the O-RU keeps the C-Plane active). The sleep duration is set to 4 radio frames (40 ms), wherein the wake-up latency is M equal to 60 slots. Accordingly, for a SCS of 15 KHz the total sleep duration is equal to 100 slots (40 slots+60 slots (wake-up latency)).

In operation 1, the O-DU sends a sleep mode (SM #2) activation request to O-RU using a ST4 message (i.e., a C-Plane message).

In operation 2, the O-DU sends a "asmflag" that SM2 remain active until O-RU receive another SM2 wake-up command from O-DU. Upon sending the "asmflag" the sleep mode starts. The "asmflag" bit mapping is as follows:

| "asmflag" bit mapping | |
|---|---|
| 00 | SM0/Reserved |
| 01 | SM1 |
| 10 | SM2 |
| 11 | SM3 |

In operation 3, the O-DU sends wake-up command (SM1).

In operation 4, the O-RU wakes up and sends and carrier becomes active message to the O-DU. The O-RU wake-up latency between operation 3 and operation 4 is M equal to 60 slots. With operation 4, the sleep mode ends.

Figure 16:
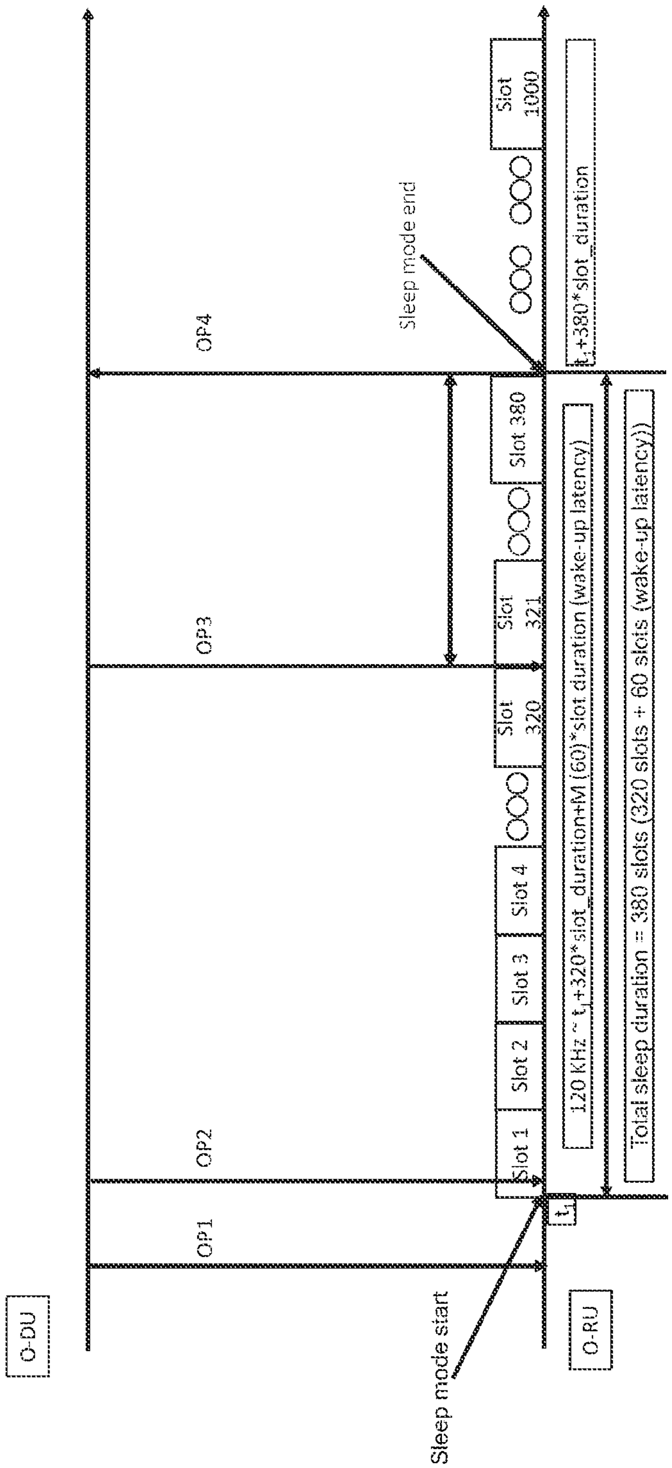
FIG. 16 illustrates a flowchart for the start and wake-up process between the O-DU and the O-RU for sleep mode implementation by Control-Plane Section Type 4 Messaging according to an example embodiment.

FIG. 16 illustrates a flowchart for the start and wake-up process between the O-DU and the O-RU for sleep mode implementation by Control-Plane Section Type 4 Messaging. Referring to FIG. 16, the parameters as shown in FIGS.

13 and 14 are applied to implement the sleep modes. FIG. 16 shows the implementation of second sleep mode type SM2, (i.e., an advanced sleep mode) by ST4 message. According to the example embodiment, the SCS is 120 KHz for SM2. The O-RU advertised the minimum sleep duration/wake-up latency (i.e., SM2-M slots) via M-Plane messaging of the configuration capability information (wake-up latency information) to the O-DU. Regarding the sleep mode implementation in FIG. 15, the SM2 refers to a defined sleep, i.e., the O-RU schedule a sleep for any number of slots (SM2>M slots), wherein the C-Plane remains active (i.e., the O-RU keeps the C-Plane active). The sleep duration is set to 4 radio frames (40 ms), wherein the wake-up latency is M equal to 60 slots. Accordingly, for a SCS of 120 KHz the total sleep duration is equal to 380 slots (320 slots+60 slots (wake-up latency)).

In operation 1, the O-DU sends a sleep mode (SM #2) activation request to O-RU using a ST4 message (i.e., a C-Plane message).

In operation 2, the O-DU sends a "asmflag" that SM2 remain active until O-RU receive another SM2 wake-up command from O-DU. Upon sending the "asmflag" the sleep mode starts. The "asmflag" bit mapping is as follows:

| "asmflag" bit mapping | |
|---|---|
| 00 | SM0/Reserved |
| 01 | SM1 |
| 10 | SM2 |
| 11 | SM3 |

In operation 3, the O-DU sends wake-up command (SM1).

In operation 4, the O-RU wakes up and sends and carrier becomes active message to the O-DU. The O-RU wake-up latency between operation 3 and operation 4 is M equal to 60 slots. With operation 4, the sleep mode ends.

Figure 17:
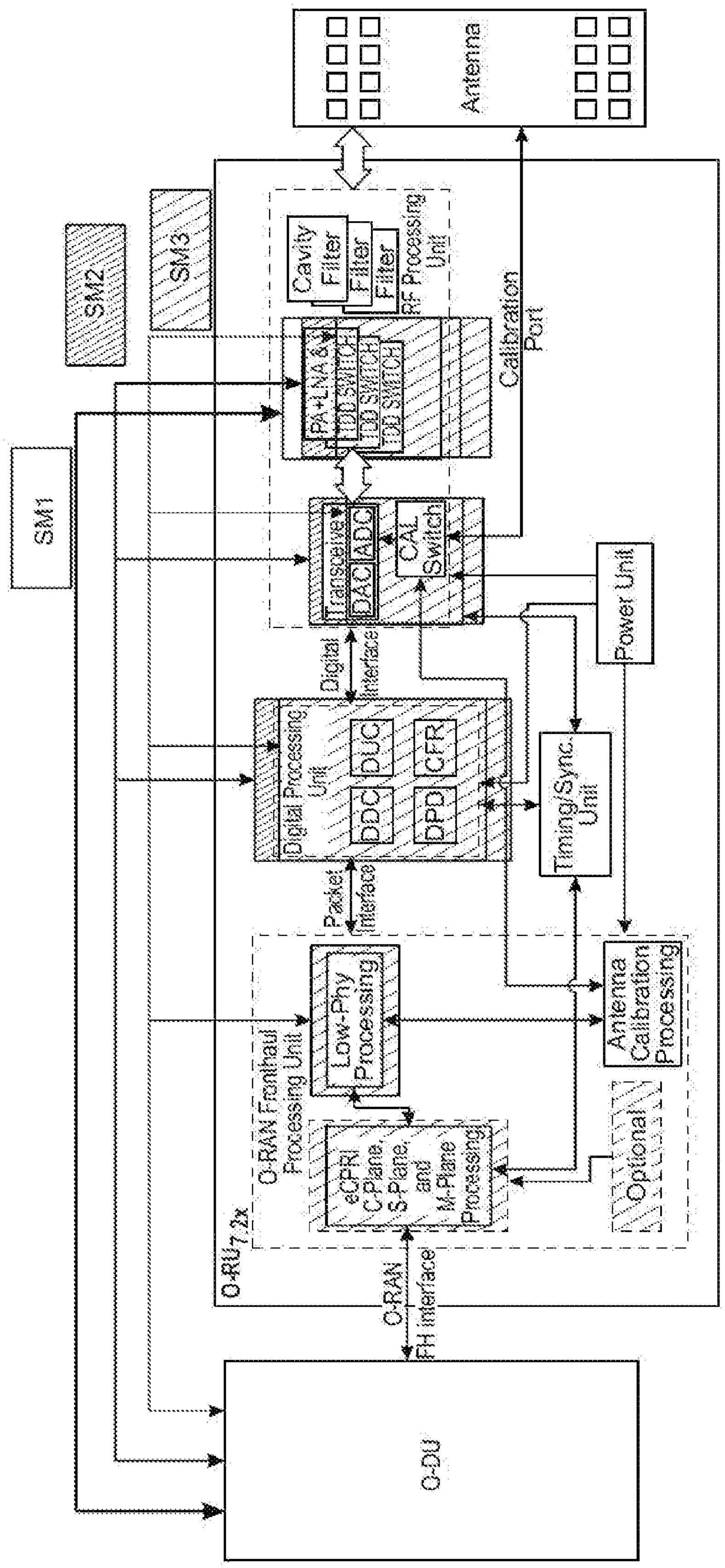
FIG. 17 illustrates the deactivation of O-RU parts by Control-Plane Section Type 4 Messaging activating sleep mode types in the O-RU according to an example embodiment.

FIG. 17 illustrates the deactivation of O-RU parts by Control-Plane Section Type 4 Messaging activating sleep mode types in the O-RU. Referring to FIG. 17, the deactivation of O-RU parts by Control-Plane Section Type 4 Messaging considers the wake-up latency of O-RU components, one or more O-RU parts are turned off for each sleep mode.

Referring to FIG. 17, the O-Du is connected to the O-RU via O-RAN FH interface. The O-RU comprises of O-RAN Fronthaul processing unit hosting an evolved Common Public Radio Interface (eCPRI), and the processing resources for C-Plane, S-Plane and M-Plane processing. Moreover, the O-RAN Fronthaul processing unit hosts Low physical (phy) processing and antenna calibration processing. The O-RAN Fronthaul processing unit is connected to the Digital Processing Unit via a packet interface. The Digital Processing Unit hosts digital pre-distortion (DPD), crest factor reduction (CFR), digital up-conversion (DUC) and digital down-conversion (DDC) of component carriers. The Digital Processing Unit is connected to the Radio Frontend (RF) Processing Unit via a digital interface. The RF Processing Unit hosts the Transceivers (TRx) together with the analog-to-digital converter (ADC) and digital-to-analog converter (DAC), a calibration CAL switch, time division multiplexing (TDD) front ends with low noise amplifier (LNA) and a power amplifier (PA) as well as cavity filters. The O-RAN Fronthaul processing unit, Digital Processing Unit and the RF Processing Unit are synchronized by a Timing/Synchronization Unit and powered by a power unit of the O-RU.

During sleep mode 1, SM1 enables the O-RU to turn off the PA/LNA as the wake-up latency or minimum sleep duration matches with the one defined for SM1, for e.g., L slots.

During sleep mode 2, SM2 enables the O-RU to turn off the PA/LNA. Moreover, the O-RU may turn off the RF and digital processing units as the wake-up latency or minimum sleep duration matches with the one defined for SM2, for e.g., M slots During sleep mode 3, SM3 enables the O-RU to turn off the PA/LNA. Moreover, the O-RU may turn off at least one of a RF Processing Unit, a Digital Processing Unit, and a Low-Phy Processing Unit. Moreover, for example, at least one of a eCPRI, C-Plane, U-Plane, S-Plane and M-Plane processing unit could be turned off as the wake-up latency or minimum sleep duration matches with the one defined, for example, for SM3, for e.g., N slots FIG. 18 illustrates an embodiment for TRx control and sleep modes according to a Section Type 4 command type (ST4CmdType) TRX-CONTROL and Section Type 4 command common header format. Referring to FIG. 18 the (ST4CmdType) TRx control is similar to one in FIG. 12. The use of TRX-CONTROL command (defined sleep duration) comprises that the O-DU reads the O-RU sleep capabilities including L, M, and N values for the supported sleep levels as provided from the M-Plane messaging of the configuration capability information. In case the O-DU determines to deactivate some antenna elements/layers, it issues the TRX-CONTROL command. The determination may be based on based on the configuration capability information from the O-RU and based on the request to reconfigure the antenna array from the higher layer network function. According to an example embodiment, the parameter numSlots may be set to value not equal to NULL (0). In this case, the sleep duration is known as a specified number of slots, sleepDepth may be set to the maximum possible such that numSlots≥L or M or N. Moreover, if numSlots<L, the sleepDepth may be set to 0. In this case the SleepDurIndex is ignored.

According to an example embodiment, the parameter numSlots may be set to value equal to NULL (0) and the parameter sleepDurIndex may be set to value not equal to 0xF. In this case the sleep duration is known via M-Plane (up to 14 possible values). Moreover, in this case C-Plane processing may be turned off for the designated duration. The parameter sleepDepth is ignored in this case because the depth of sleep may be inferred from the sleepDurIndex value.

Referring to FIG. 18, the Section Type 4 command common header format comprises the parameter "numSlots", which is a one Octet sequence according to the $20^{th}$ Octet in the common header. Up to 255 slots are configurable for the sleep modes SM1, SM2, and SM3. For other sleep duration, 14 possible values to be known to the O-DU via the M Plane. However, in an example embodiment the Sleep modes per O-RU may be 17, which leads to an extension of sleep modes and an additional utilization of sleep mode models on tops of SM1, SM2, SM3.

Figure 19:
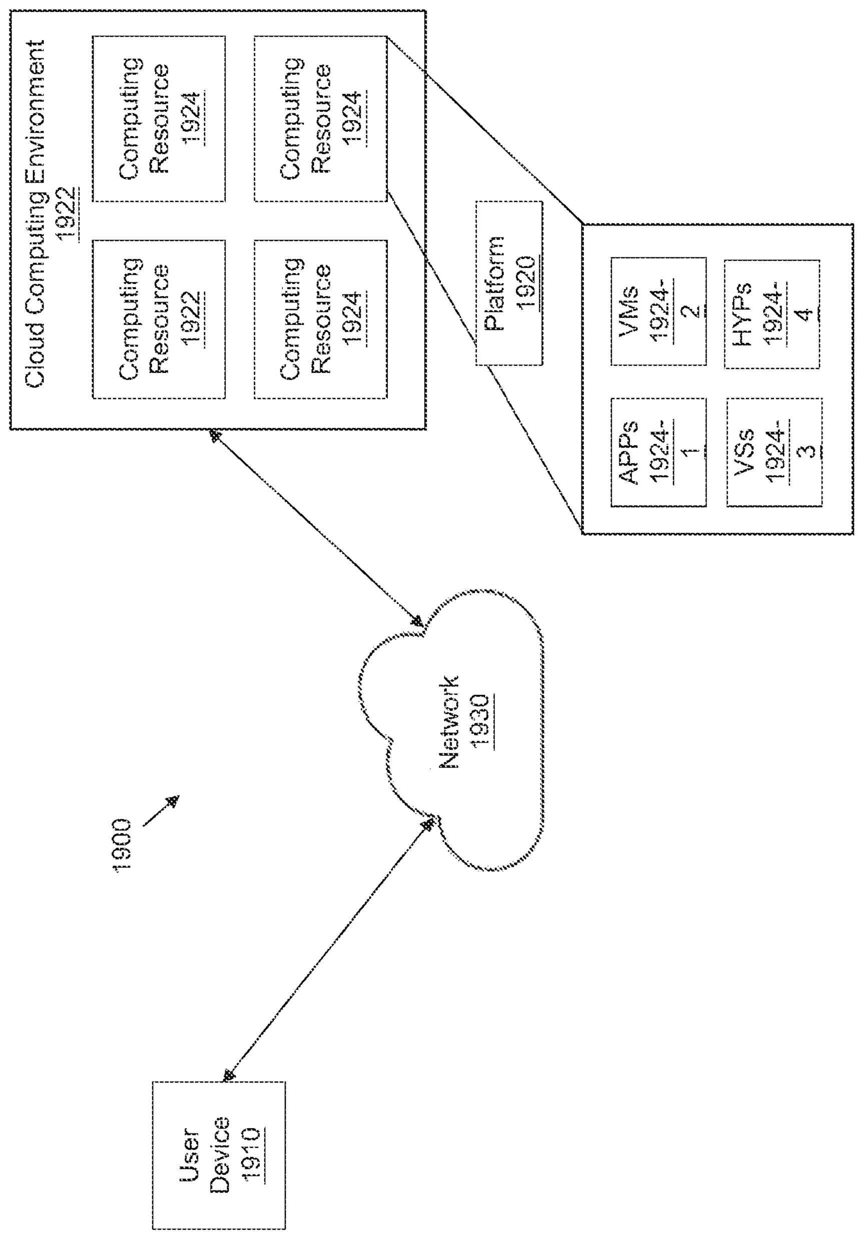
FIG. 19 is a diagram of an example environment in which systems and/or methods, described herein, may be implemented.

FIG. 19 is a diagram of an example environment 1900 in which systems and/or methods, described herein, may be implemented. As shown in FIG. 19, environment 1900 may include a user device 1910, a platform 1920, and a network 1930. Devices of environment 1900 may interconnect via wired connections, wireless connections, or a combination of wired and wireless connections. In embodiments, any of the functions and operations described with reference to FIG. 1 above may be performed by any combination of elements illustrated in FIG. 19.

User device 1910 includes one or more devices capable of receiving, generating, storing, processing, and/or providing information associated with platform 1920. For example, user device 1910 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 1910 may receive information from and/or transmit information to platform 1920.

Platform 1920 includes one or more devices capable of receiving, generating, storing, processing, and/or providing information. In some implementations, platform 1920 may include a cloud server or a group of cloud servers. In some implementations, platform 1920 may be designed to be modular such that certain software components may be swapped in or out depending on a particular need. As such, platform 1920 may be easily and/or quickly reconfigured for different uses.

In some implementations, as shown, platform 1920 may be hosted in cloud computing environment 1922. Notably, while implementations described herein describe platform 1920 as being hosted in cloud computing environment 1922, in some implementations, platform 1920 may not be cloud-based (i.e., may be implemented outside of a cloud computing environment) or may be partially cloud-based.

Cloud computing environment 1922 includes an environment that hosts platform 1920. Cloud computing environment 1922 may provide computation, software, data access, storage, etc., services that do not require end-user (e.g., user device 1910) knowledge of a physical location and configuration of system(s) and/or device(s) that hosts platform 1920. As shown, cloud computing environment 1922 may include a group of computing resources 1924 (referred to collectively as "computing resources 1924" and individually as "computing resource 1924").

Computing resource 1924 includes one or more personal computers, a cluster of computing devices, workstation computers, server devices, or other types of computation and/or communication devices. In some implementations, computing resource 1924 may host platform 1920. The cloud resources may include compute instances executing in computing resource 1924, storage devices provided in computing resource 1924, data transfer devices provided by computing resource 1924, etc. In some implementations, computing resource 1924 may communicate with other computing resources 1924 via wired connections, wireless connections, or a combination of wired and wireless connections.

As further shown in FIG. 19, computing resource 1924 includes a group of cloud resources, such as one or more applications ("APPs") 1924-1, one or more virtual machines ("VMs") 1924-2, virtualized storage ("VSs") 1924-3, one or more hypervisors ("HYPs") 1924-4, or the like. It is understood that one or more example embodiments are not limited to a particular type of cloud computing environment and may be implemented on one or more servers in the form of virtualized network functions (VNFs), containerized and/or cloud-native functions (CNFs), and the like.

Application 1924-1 includes one or more software applications that may be provided to or accessed by user device 1910. Application 1924-1 may eliminate the need to install and execute the software applications on user device 1910. For example, application 1924-1 may include software associated with platform 1920 and/or any other software capable of being provided via cloud computing environment 1922. In some implementations, one application 1924-1 may send/receive information to/from one or more other applications 1924-1, via virtual machine 1924-2.

Virtual machine 1924-2 includes a software implementation of a machine (e.g., a computer) that executes programs like a physical machine. Virtual machine 1924-2 may be either a system virtual machine or a process virtual machine, depending upon use and degree of correspondence to any real machine by virtual machine 1924-2. A system virtual machine may provide a complete system platform that supports execution of a complete operating system ("OS"). A process virtual machine may execute a single program, and may support a single process. In some implementations, virtual machine 1924-2 may execute on behalf of a user (e.g., user device 1910), and may manage infrastructure of cloud computing environment 1922, such as data management, synchronization, or long-duration data transfers.

Virtualized storage 1924-3 includes one or more storage systems and/or one or more devices that use virtualization techniques within the storage systems or devices of computing resource 1924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1924-4 may provide hardware virtualization techniques that allow multiple operating systems (e.g., "guest operating systems") to execute concurrently on a host computer, such as computing resource 1924. Hypervisor 1924-4 may present a virtual operating platform to the guest operating systems, and may manage the execution of the guest operating systems. Multiple instances of a variety of operating systems may share virtualized hardware resources.

Network 1930 includes one or more wired and/or wireless networks. For example, network 1930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 19 are provided as an example. In practice, there may be additional devices and/or networks, fewer devices and/or networks, different devices and/or networks, or differently arranged devices and/or networks than those shown in FIG. 19. Furthermore, two or more devices shown in FIG. 19 may be implemented within a single device, or a single device shown in FIG. 19 may be implemented as multiple, distributed devices. Additionally, or alternatively, a set of devices (e.g., one or more devices) of environment 1900 may perform one or more functions described as being performed by another set of devices of environment 2000.

According to embodiments, the O-RU and the O-DU (or one or more operations associated therewith) described herein may be implemented or be deployed in the server platform described above, in the form of virtualized network function (VNF). In this regard, it is contemplated that the terms "virtual", "virtualized", or the like, described hereinabove are merely intended to specify the nature of the machine (and the elements and resources associated therewith) being provided in virtual or software form. In this regard, the "virtual machine", "virtualized storage", and the like, described hereinabove should not be limited to any specific type of virtual machine or virtual element. Accordingly, it can be understood that the (or operations associated therewith) may be defined or presented in the form of a containerized network function, of which the functions may be provided in the form of containers.

Figure 20:
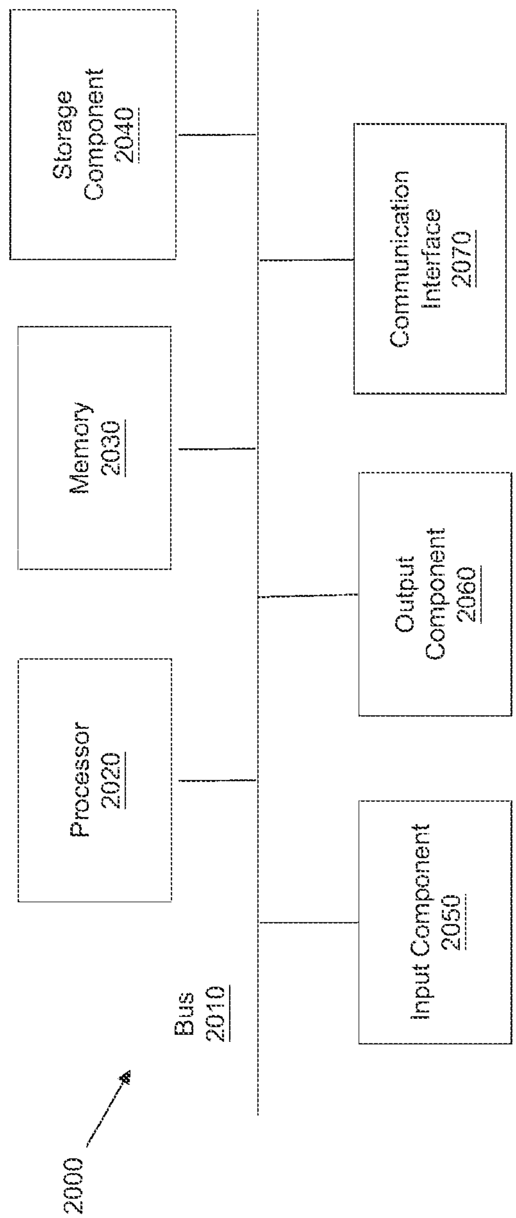
FIG. 20 is a diagram of example components of a device according to an embodiment.

FIG. 20 is a diagram of example components of device 2000. Device 2000 may correspond to user device 2010 and/or platform 1920. As shown in FIG. 20, device 2000 may include a bus 2010, a processor 2020, a memory 2030, a storage component 2040, an input component 2050, an output component 2060, and a communication interface 2070.

Bus 2010 includes a component that permits communication among the components of device 2000. Processor 2020 may be implemented in hardware, firmware, or a combination of hardware and software. Processor 2020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 2020 includes one or more processors capable of being programmed to perform a function. Memory 2030 includes a random-access memory (RAM), a read only memory (ROM), and/or another type of dynamic or static storage device (e.g., a flash memory, a magnetic memory, and/or an optical memory) that stores information and/or instructions for use by processor 2020.

Storage component 2040 stores information and/or software related to the operation and use of device 2000. For example, storage component 2040 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 2050 includes a component that permits device 2000 to receive information, such as via user input (e.g., a touch screen display, a keyboard, a keypad, a mouse, a button, a switch, and/or a microphone). Additionally, or alternatively, input component 2050 may include a sensor for sensing information (e.g., a global positioning system (GPS) component, an accelerometer, a gyroscope, and/or an actuator). Output component 2060 includes a component that provides output information from device 2000 (e.g., a display, a speaker, and/or one or more light-emitting diodes (LEDs)).

Communication interface 2070 includes a transceiver-like component (e.g., a transceiver and/or a separate receiver and transmitter) that enables device 2000 to communicate with other devices, such as via a wired connection, a wireless connection, or a combination of wired and wireless connections. Communication interface 2070 may permit device 2000 to receive information from another device and/or provide information to another device. For example, communication interface 2070 may include an Ethernet interface, an optical interface, a coaxial interface, an infrared interface, a radio frequency (RF) interface, a universal serial bus (USB) interface, a Wi-Fi interface, a cellular network interface, or the like.

Device 2000 may perform one or more processes described herein. Device 2000 may perform these processes in response to processor 2020 executing software instructions stored by a non-transitory computer-readable medium, such as memory 2030 and/or storage component 2040. A computer-readable medium is defined herein as a non-transitory memory device. A memory device includes memory space within a single physical storage device or memory space spread across multiple physical storage devices.

Software instructions may be read into memory 2030 and/or storage component 2040 from another computer-readable medium or from another device via communication interface 2070. When executed, software instructions stored in memory 2030 and/or storage component 2040 may cause processor 2020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 20 are provided as an example. In practice, device 2000 may include additional components, fewer components, different components, or differently arranged components than those shown in FIG. 20. Additionally, or alternatively, a set of components (e.g., one or more components) of device 2000 may perform one or more functions described as being performed by another set of components of device 2000.

In embodiments, any one of the operations or processes of FIGS. 2 to 11 may be implemented by or using any one of the elements illustrated in FIGS. 19 and 20. It is understood that other embodiments are not limited thereto, and may be implemented in a variety of different architectures (e.g., bare metal architecture, any cloud-based architecture or deployment architecture such as Kubernetes, Docker, OpenStack, etc.).

According to embodiments, the O-RU, O-DU, etc. (or one or more operations associated therewith) may be implemented in the form of a containerized network function, according to one or more embodiments. Below, an example configuration for implementing the containerized functions is provided.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that apparatuses and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

In view of the above, various further respective aspects and features of embodiments of the present disclosure may be defined by the following items:

Item [1] An apparatus includes: a distributed unit (O-DU), the O-DU configured to: receive from a radio unit (O-RU), configuration capability information via management plane (M-Plane) messaging from the O-RU; receive from a higher layer network function, a request to reconfigure an antenna array; based on the configuration capability information from the O-RU and based on the request to reconfigure the antenna array from the higher layer network function, determine a sleep mode type supported by the O-RU; and based on the supported sleep mode type, apply the supported sleep mode type via a C-Plane Section Type 4 message or M-Plane command to the O-RU.

Item [2] The apparatus according to Item [1], wherein the configuration capability information may further include wake-up latency information for sleep mode types, and wherein the O-DU may be further configured to: receive the wake-up latency information advertising L slots for a first sleep mode type SM1, M slots for a second sleep mode type SM2, and N slots for a third sleep mode type SM3 via M-Plane messaging from the O-DU.

Item [3] The apparatus according to Item [2], the O-DU may be further configured to: based on the supported sleep mode type, apply the supported sleep mode type for a fixed number of slots defined by at least one of a parameter extnumSlots and numSlots of the C-Plane Section Type 4 message.

Item [4] The apparatus according to Item [3], wherein the total sleep duration in slots is the sum of slots defined by the parameters extnumSlots and numSlots as applied, by the O-DU, via the C-Plane Section Type 4 message to the O-RU and the wake-up latency information for each sleep mode type as received, by the O-DU, via M-Plane messaging from the O-RU.

Item [5] The apparatus according to Item [2], wherein the O-DU may be further configured to: apply a parameter asmflag via the C-Plane Section Type 4 message to the O-RU, wherein parameter asmflag defines that at least one of SM1, SM2 and SM3 is in an active state for an undefined sleep duration or in an active state for a defined sleep duration.

Item [6] The apparatus according to Item [5], wherein the O-DU may be further configured to: based on the application of the parameter asmflag via the C-Plane Section Type 4 message, send a C-Plane Section Type 4 message to wake up the O-RU from at least one of the SM1, SM2 and SM3.

Item [7] The apparatus according to Item [6], wherein the O-DU may be further configured to: apply a parameter asmflag via the C-Plane Section Type 4 message to the O-RU, wherein parameter asmflag defines that at least one of SM1, SM2 and SM3 is in an active state for an undefined sleep duration; based on the undefined sleep duration, send an interrupt via a C-Plane Section Type 4 message to wake up the O-RU from at least one of the SM1, SM2 and SM3.

Item [8] The apparatus according to any one of Items [5 to 8], wherein the apparatus may further include: based on a defined sleep duration, for a predermined sleep duration apply via M-Plane messaging a CU-Plane wake-up command.

Item [9] An apparatus includes: a radio unit (O-RU) configured to: send configuration capability information via a management plane (M-Plane) command to an open distributed unit (O-DU); receive, from the O-DU, a sleep mode type supported by the O-RU via a C-Plane Section Type 4 message or M-Plane command, wherein the supported sleep mode type is based on the configuration capability information of the O-RU and a request to reconfigure the antenna array from a higher layer network function; and based on the supported sleep mode type for the O-RU, activate the sleep mode type to parts of the O-RU.

Item [10] The apparatus according to Item [9], wherein the configuration capability information may further include wake-up latency information for sleep mode types, and wherein the O-RU may be further configured to: send the wake-up latency information advertising L slots for a first sleep mode type SM1, M slots for a second sleep mode type SM2, and N slots for a third sleep mode type SM3 via M-Plane messaging.

Item [11] The apparatus according to Item [9], wherein the O-RU may be further configured to: receive a parameter asmflag via the C-Plane Section Type 4 message to the O-RU, wherein parameter asmflag defines that at least one of SM1, SM2 and SM3 is in an active state for a defined sleep duration; based on a defined sleep duration, deactivate the CU Plane processing unit of O-RU.

Item [12] The apparatus according to any one of Items [9 to 11], wherein the O-RU may be further configured to: based on a defined sleep duration, for a predetermined sleep duration, send an ACK/NACK message via C-Plane Section Type 8 messaging, wherein the ACK message signals the O-DU to start scheduling CU-Plane data.

Item [13] The apparatus according to any one of Items [9 to 12], wherein the O-RU may be further configured to: receive a parameter asmflag via the C-Plane Section Type 4 message to the O-RU, wherein parameter asmflag defines that at least one of SM1, SM2 and SM3 is in an active state for an sleep duration, based on the undefined sleep duration, deactivate logic Radio Frequency components (FPGA, RFIC) and RF front-end modules (RFFE) components depending on the wake-up latency information.

Item [14] A method, the method includes: receiving, by a distributed unit (O-DU) from a radio unit (O-RU), configuration capability information via management plane (M-Plane) messaging from the O-RU; receiving, by the O-DU from a higher layer network function, a request to reconfigure an antenna array; based on the configuration capability information from the O-RU and based on the request to reconfigure the antenna array from the higher layer network function, determining, by the O-DU, a sleep mode type supported by the O-RU; and based on the supported sleep mode type, applying, by the O-DU, the supported sleep mode type via a C-Plane Section Type 4 message or M-Plane command to the O-RU.

Item [15] The method according to Item [14], wherein the configuration capability information may further include wake-up latency information for sleep mode types, and wherein the method may further include: receiving, by the O-DU, the wake-up latency information advertising L slots for a first sleep mode type SM1, M slots for a second sleep mode type SM2, and N slots for a third sleep mode type SM3 via M-Plane messaging from the O-DU.

Item [16] The method according to Item [14], wherein the method may further include: based on the supported sleep mode type, by the O-DU, applying the supported sleep mode type for a fixed number of slots defined by at least one of a parameter extnumSlots and numSlots of the C-Plane Section Type 4 message.

Item [17] The method according to Item [15], wherein the total sleep duration in slots is the sum of slots defined by the parameters extnumSlots and numSlots as applied, by the O-DU, via the C-Plane Section Type 4 message to the O-RU and the wake-up latency information for each sleep mode type as received, by the O-DU, via M-Plane messaging from the O-RU.

Item [18] The method according to Item [15], wherein the method may further include: applying, by the O-DU, a parameter asmflag via the C-Plane Section Type 4 message to the O-RU, wherein parameter asmflag defines that at least one of SM1, SM2 and SM3 is in an active state for an undefined sleep duration or in an active state for a defined sleep duration.

Item [19] The method according to Item [18], wherein the method may further include: based on the application of the parameter asmflag via the C-Plane Section Type 4 message, sending, by the O-DU, a C-Plane Section Type 4 message to wake up the O-RU from at least one of the SM1, SM2 and SM3.

Item [20] The method according to Item [18], wherein the method may further include: applying, by the O-DU, a parameter asmflag via the C-Plane Section Type 4 message to the O-RU, wherein parameter asmflag defines that at least one of SM1, SM2 and SM3 is in an active state for an undefined sleep duration; based on the undefined sleep duration, sending, by the O-DU, an interrupt via a C-Plane Section Type 4 message to wake up the O-RU from at least one of the SM1, SM2 and SM3.

Item [21] The method according to any one of Items [14 to 20], wherein the method may further include: based on a defined sleep duration, for a predetermined sleep duration applying, by the O-DU, via M-Plane messaging a CU-Plane wake-up command.

Item [22] A method, the method includes: sending, by a radio unit (O-RU) to an open distributed unit (O-DU), configuration capability information via a management plane (M-Plane) command; receiving, by the O-RU from the O-DU, a sleep mode type supported by the O-RU via a C-Plane Section Type 4 message or M-Plane command, wherein the supported sleep mode type is based on the configuration capability information of the O-RU and a request to reconfigure the antenna array from a higher layer network function; and based on the supported sleep mode type for the O-RU, activating, by the O-RU, the sleep mode type to parts of the O-RU.

Item [23] The method according to Item [22], wherein the configuration capability information may further include wake-up latency information for sleep mode types, and wherein the method may further include: sending, by the O-RU, the wake-up latency information advertising L slots for a first sleep mode type SM1, M slots for a second sleep mode type SM2, and N slots for a third sleep mode type SM3 via M-Plane messaging.

Item [24] The method according to Item [22], wherein the method may further include: receiving, by the O-RU, a parameter asmflag via the C-Plane Section Type 4 message to the O-RU, wherein parameter asmflag defines that at least one of SM1, SM2 and SM3 is in an active state for a defined sleep duration; based on a defined sleep duration, deactivating, by the O-RU, the CU-Plane processing unit.

Item [25] The method according to any one of Items [22 to 24], wherein the method may further include: based on a defined sleep duration, for a predetermined sleep duration, sending, by the O-RU, an ACK/NACK message via C-Plane Section Type 8 messaging, wherein the ACK message signals the O-DU to start scheduling CU-Plane data.

Item [26] The method according to any one of Items [22 to 24], wherein the method may further include: receiving, by the O-RU, a parameter asmflag via the C-Plane Section Type 4 message to the O-RU, wherein parameter asmflag defines that at least one of SM1, SM2 and SM3 is in an active state for an undefined sleep duration, based on the undefined sleep duration, deactivating, by the O-RU, logic Radio Frequency components (FPGA, RFIC) and RF front-end modules (RFFE) components depending on the wake-up latency information.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. An apparatus comprising:

a distributed unit (O-DU), the O-DU configured to:

receive from a radio unit (O-RU), configuration capability information via management plane (M-Plane) messaging from the O-RU;

receive from a higher layer network function, a request to reconfigure an antenna array;

based on the configuration capability information from the O-RU and based on the request to reconfigure the antenna array from the higher layer network function, determine a sleep mode type supported by the O-RU; and based on the supported sleep mode type, apply the supported sleep mode type via a C-Plane Section Type 4 message or a M-Plane command to the O-RU.

2. The apparatus as claimed in claim 1, wherein the configuration capability information further comprises wake-up latency information for sleep mode types, and wherein the O-DU is further configured to:

receive the wake-up latency information advertising L slots for a first sleep mode type SM1, M slots for a second sleep mode type SM2, and N slots for a third sleep mode type SM3 via M-Plane messaging from the O-DU.

3. The apparatus as claimed in claim 2, the O-DU is further configured to:

based on the supported sleep mode type, apply the supported sleep mode type for a fixed number of slots defined by at least one of a parameter extnumSlots and numSlots of the C-Plane Section Type 4 message.

4. The apparatus as claimed in claim 3, wherein the total sleep duration in slots is the sum of slots defined by the parameters extnumSlots and numSlots as applied, by the O-DU, via the C-Plane Section Type 4 message to the O-RU and the wake-up latency information for each sleep mode type as received, by the O-DU, via M-Plane messaging from the O-RU.

5. The apparatus as claimed in claim 2, wherein the O-DU is further configured to:

apply a parameter asmflag via the C-Plane Section Type 4 message to the O-RU, wherein parameter asmflag defines that at least one of SM1, SM2 and SM3 is in an active state for an undefined sleep duration or in an active state for a defined sleep duration.

6. The apparatus as claimed in claim 5, wherein the O-DU is further configured to:

based on the application of the parameter asmflag via the C-Plane Section Type 4 message, send a C-Plane Section Type 4 message to wake up the O-RU from at least one of the SM1, SM2 and SM3.

7. The apparatus as claimed in claim 5, wherein the O-DU is further configured to:

apply a parameter asmflag via the C-Plane Section Type 4 message to the O-RU, wherein parameter asmflag defines that at least one of SM1, SM2 and SM3 is in an active state for an undefined sleep duration; and based on the undefined sleep duration, send an interrupt via a C-Plane Section Type 4 message to wake up the O-RU from at least one of the SM1, SM2 and SM3.

8. A method, the method comprising:

receiving, by a distributed unit (O-DU) from a radio unit (O-RU), configuration capability information via management plane (M-Plane) messaging from the O-RU;

receiving, by the O-DU from a higher layer network function, a request to reconfigure an antenna array;

based on the configuration capability information from the O-RU and based on the request to reconfigure the antenna array from the higher layer network function, determining, by the O-DU, a sleep mode type supported by the O-RU; and based on the supported sleep mode type, applying, by the O-DU, the supported sleep mode type via a C-Plane Section Type 4 message or M-Plane command to the O-RU.

9. The method as claimed in claim 8, wherein the configuration capability information further comprises wake-up latency information for sleep mode types, and wherein the method further comprises:

receiving, by the O-DU, the wake-up latency information advertising L slots for a first sleep mode type SM1, M slots for a second sleep mode type SM2, and N slots for a third sleep mode type SM3 via M-Plane messaging from the O-DU.

10. The method as claimed in claim 8, wherein the method further comprises:

based on the supported sleep mode type, by the O-DU, applying the supported sleep mode type for a fixed number of slots defined by at least one of a parameter extnumSlots and numSlots of the C-Plane Section Type 4 message.

11. The method as claimed in claim 10, wherein the total sleep duration in slots is the sum of slots defined by the parameters extnumSlots and numSlots as applied, by the O-DU, via the C-Plane Section Type 4 message to the O-RU and the wake-up latency information for each sleep mode type as received, by the O-DU, via M-Plane messaging from the O-RU.

12. The method as claimed in claim 9, wherein the method further comprises:

applying, by the O-DU, a parameter asmflag via the C-Plane Section Type 4 message to the O-RU, wherein parameter asmflag defines that at least one of SM1, SM2 and SM3 is in an active state for an undefined sleep duration or in an active state for a defined sleep duration.

13. The method as claimed in claim 12, wherein the method further comprises: based on the application of the parameter asmflag via the C-Plane Section Type 4 message, sending, by the O-DU, a C-Plane Section Type 4 message to wake up the O-RU from at least one of the SM1, SM2 and SM3.

14. The method as claimed in claim 12, wherein the method further comprises:

applying, by the O-DU, a parameter asmflag via the C-Plane Section Type 4 message to the O-RU, wherein parameter asmflag defines that at least one of SM1, SM2 and SM3 is in an active state for an undefined sleep duration; and based on the undefined sleep duration, sending, by the O-DU, an interrupt via a C-Plane Section Type 4 message to wake up the O-RU from at least one of the SM1, SM2 and SM3.

15. The method as claimed in claim 12, wherein the method further comprises:

based on a defined sleep duration, for a predetermined sleep duration applying, by the O-DU, via M-Plane messaging a CU-Plane wake-up command.

16. A method, the method comprising:

sending, by a radio unit (O-RU) to an open distributed unit (O-DU), configuration capability information via a management plane (M-Plane) command;

receiving, by the O-RU from the O-DU, a sleep mode type supported by the O-RU via a C-Plane Section Type 4 message or M-Plane command, wherein the supported sleep mode type is based on the configuration capability information of the O-RU and a request to reconfigure the antenna array from a higher layer network function; and based on the supported sleep mode type for the O-RU, activating, by the O-RU, the sleep mode type to parts of the O-RU.

17. The method as claimed in claim 16, wherein the configuration capability information further comprises wake-up latency information for sleep mode types, and wherein the method further comprises:

sending, by the O-RU, the wake-up latency information advertising L slots for a first sleep mode type SM1, M slots for a second sleep mode type SM2, and N slots for a third sleep mode type SM3 via M-Plane messaging.

18. The method as claimed in claim 16, wherein the method further comprises:

receiving, by the O-RU, a parameter asmflag via the C-Plane Section Type 4 message to the O-RU, wherein parameter asmflag defines that at least one of SM1, SM2 and SM3 is in an active state for a defined sleep duration; and based on a defined sleep duration, deactivating, by the O-RU, the CU-Plane processing unit.

19. The method as claimed in claim 16, wherein the method further comprises: based on a defined sleep duration, for a predetermined sleep duration, sending, by the O-RU, an ACK/NACK message via C-Plane Section Type 8 messaging, wherein the ACK message signals the O-DU to start scheduling CU-Plane data.

20. The method as claimed in claim 16, wherein the method further comprises:

receiving, by the O-RU, a parameter asmflag via the C-Plane Section Type 4 message to the O-RU, wherein parameter asmflag defines that at least one of SM1, SM2 and SM3 is in an active state for an undefined sleep duration; and based on the undefined sleep duration, deactivating, by the O-RU, logic Radio Frequency components (FPGA, RFIC) and RF front-end modules (RFFE) components depending on the wake-up latency information.

* * * * *